United States Patent
Bhosle et al.

(10) Patent No.: US 11,425,256 B2
(45) Date of Patent: Aug. 23, 2022

(54) AUTOMATIC PRESENCE-BASED CONFERENCE JOINING METHODS AND SYSTEMS

(71) Applicant: Avaya Management L.P., Santa Clara, CA (US)

(72) Inventors: Siddhesh Bhosle, Pune (IN); Ankita Desai, Pune (IN)

(73) Assignee: Avaya Management L.P., Santa Clara, CA (US)

( * ) Notice: Subject to any disclaimer, the term of this patent is extended or adjusted under 35 U.S.C. 154(b) by 0 days.

(21) Appl. No.: 16/997,128

(22) Filed: Aug. 19, 2020

(65) Prior Publication Data
US 2022/0060584 A1  Feb. 24, 2022

(51) Int. Cl.
*H04M 3/42* (2006.01)
*H04M 7/00* (2006.01)
*H04M 3/56* (2006.01)

(52) U.S. Cl.
CPC ....... *H04M 3/561* (2013.01); *H04M 3/42365* (2013.01); *H04M 3/565* (2013.01); *H04M 7/0075* (2013.01)

(58) Field of Classification Search
USPC ....................................................... 370/261
See application file for complete search history.

(56) References Cited

U.S. PATENT DOCUMENTS

| | | | |
|---|---|---|---|
| 8,270,320 B2 | 9/2012 | Boyer et al. | |
| 2006/0067250 A1* | 3/2006 | Boyer | H04L 67/30 709/204 |
| 2013/0115932 A1* | 5/2013 | Williams | H04M 3/58 455/417 |
| 2013/0342637 A1* | 12/2013 | Felkai | H04N 7/14 348/E7.083 |
| 2019/0132552 A1* | 5/2019 | Yoon | G06F 16/1774 |

* cited by examiner

*Primary Examiner* — Amal S Zenati
(74) *Attorney, Agent, or Firm* — Sheridan Ross P.C.

(57) ABSTRACT

Methods and systems are provided for automatically joining a user in a conference meeting via alternative communication devices when the user is detected to be unavailable at a particular client communication device. The client communication device of the user determines that the presence of the user is set to away, indicating that the user is unavailable at the client communication device. When the client communication device determines that a conference meeting including the user as an active participant is about to begin, the client communication device determines an alternative number, and different communication device, at which to reach the user. Using the alternative number, the client communication device calls the user at the different communication device and, when answered, automatically joins the user into the conference meeting through a communication channel provided by the client communication device.

20 Claims, 8 Drawing Sheets

AUTOMATIC PRESENCE-BASED CONFERENCE JOINING METHODS AND SYSTEMS

BACKGROUND

The present disclosure is generally directed to multiple-party communications, in particular, toward automatically joining users with conference meetings.

Voice over Internet Protocol ("VoIP") clients, or softphone applications, allow users access to a range of communication services from a number of different communication devices (e.g., a mobile phone, tablet, desktop computer, etc.). These communication services can include, conference meetings, multiple-party meetings, collaborative communication sessions, and/or other communications between communication devices. Information shared during typical collaborative communication sessions may include audio, video, chat, and/or other digital content.

When installed as part of a workstation (e.g., desktop computer, etc.), VoIP clients allow employees to quickly and conveniently join conference meetings and participate in work-related communication sessions. However, there are times when users are away from their workstations. For instance, when a user is traveling, working remotely, or taking a break, that user may be unable to access their workstation. During these times, the user is unable to dial into a scheduled conference meeting via the VoIP client.

DETAILED DESCRIPTION

Figure 1:
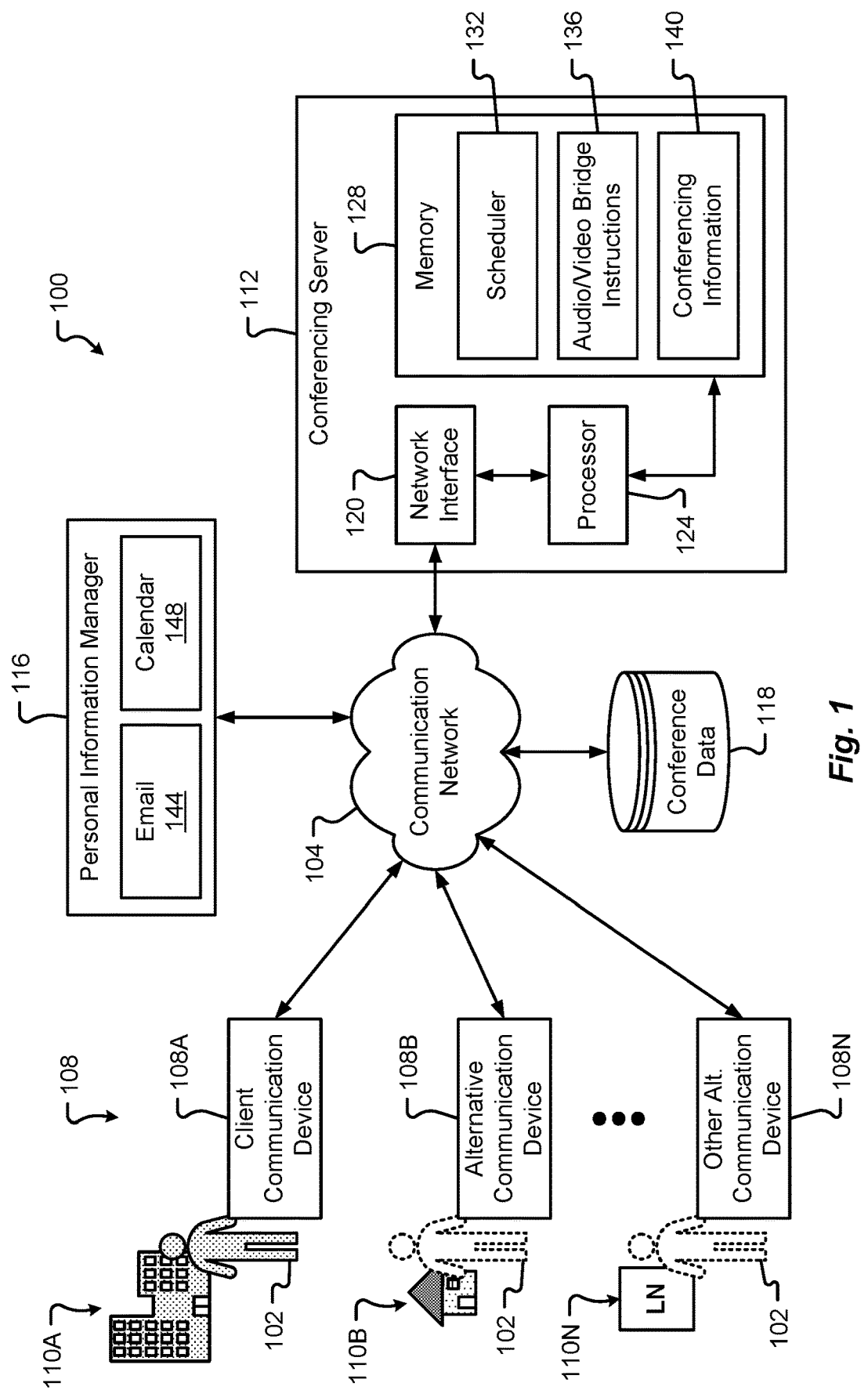
FIG. 1 depicts a block diagram of a communication system in accordance with at least some embodiments of the present disclosure.

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scope of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

In a work environment a user may operate a voice application running on a client communication device such as a workstation, computer, mobile computer, tablet, or smartphone. This voice application may correspond to a VoIP client or other softphone application that enables VoIP calling (e.g., via a phone dialing interface), access to contact lists, access to voicemail, access to scheduled meetings (e.g., via a digital calendar), chat functionality, unified communications, and/or the like. Data used by the voice application (e.g., calendar information, contact lists, voicemails, etc.) may be stored locally on the client communication device, with a personal information manager, with a conference scheduling service or server, and/or on a voice service (e.g., one or more VoIP carrier servers, databases, systems, etc.).

As provided above, a user may not always be available at the client communication device. For example, the user may be taking an unavoidable break (e.g., a bathroom break, a lunch break, a scheduled break, etc.) for a period of time. During this period of time, conventional solutions do not allow the user to use the client communication device or the voice application directly. As a result, the user may miss conference meetings, or collaborative communication sessions, and be left without the ability to work efficiently.

It is with respect to the above issues and other problems that the embodiments presented herein were contemplated. It is an object of the present disclosure to provide presence-based methods and systems that are capable of automatically joining users in a conference meeting via alternative communication devices. The client communication device of the user may determine that the presence of the user is set to away, indicating that the user is unavailable at the client communication device. When the client communication device determines that a conference meeting including the user as an active participant is about to begin, the client communication device may determine an alternative number at which to reach the user. Using the alternative number, the client communication device may call the user at a different communication device and, when answered, automatically join the user into the conference meeting through a communication channel provided by the client communication device.

In some embodiments, the methods and systems described herein automatically join a user to any (e.g., enterprise, or third-party) meeting/conference call using the presence status of a user's voice application (e.g., a VoIP application, etc.). The voice application can be on a desktop computer or a mobile computer. Among other things, the methods and systems described herein address the problem of when a user has continuous meeting scheduled to be joined and the user cannot be available at the user's workstation all the time. Additionally or alternatively, the methods and systems address the problem of when a user is working from home, or remotely, and cannot be available to dial into meeting due to multitasking. The methods and systems described herein are also capable of addressing the problem of when a user is on an unavoidable break and may be late in getting to his or her desk to dial into a meeting.

Conventional systems are restricted to conference servers, which must be within an enterprise to identify a user's presence. Otherwise, the conferencing server will never, or cannot, identify the user's presence status. Additionally, these conventional systems are related to scenarios where a conference meeting is scheduled and the conferencing server dials out to participants. However, when a user is required to dial into the conference, these conventional systems are unable to work.

In contrast, the embodiments of the present disclosure are not dependent on a conferencing server and are based on a user's voice application running on a client communication device. As can be appreciated, the embodiments described herein are not restricted to a particular conferencing server and the client communication device can automatically join calls with any server, which may be a conferencing server within an enterprise or some other third-party's conferencing server external to the enterprise. In some embodiments, the dial-out, or call, is performed and/or initiated by the voice application of the client communication device of the user to join the user in any conference meeting. In one embodiment, the methods and systems described herein use the voice application of a client communication device, which can be a desktop and/or a mobile device. The presence status of a user's voice application triggers the dial-out to add the user to a desired conference meeting, the details of which can be pulled from a calendar associated with the client communication device (e.g., a VoIP client integrated with Microsoft® Outlook, Apple® Calendar, etc., and/or combinations thereof) to join the user in the call. Among other things, this approach ensures that the user does not miss a conference meeting even when the user is unavailable at the client communication device running the voice application.

In some embodiments, the voice application, which can be either a desktop application or a mobile application polls conference meeting details from a user's email calendar (e.g., personal information manager application). The voice application uses these meeting details, depending on the user's presence status when automatically connecting a user via a home number, mobile number, or other communication device number into scheduled conference.

By way of example, a user may first receive a meeting invite, which depending upon the user's acceptance, is added into the user's calendar. In some embodiments, the meeting invite may be added including meeting details such as dial-in information (e.g., a uniform resource locators ("URL"), a phone number, etc.) and a passcode, an access code, and/or a personal identification number ("PIN"). Next, the voice application polls and synchronizes the meeting details with a calendar of the voice application (e.g., email, calendar, and/or personal information manager integration, etc.). If the user's self-presence (e.g., own voice application presence) becomes "away" then the voice application calls the user's home contact number first and, if the call goes unanswered, then the voice application may call the user's mobile number to be used for a connection to the conference meeting. In any event, when the call is answered, the voice application may then use meeting details in the calendar (e.g., of the voice application that was previously synchronized) to join the conference and add the conference into the call between the voice application running on the client communication device without any required manual intervention by the user.

In some embodiments, a user may define the presence "away" status timer on the voice application of the user. In one embodiment, if a user ignores the call from the voice application running on the client communication device, or could not answer the call at the alternative communication device, an amount of time may be predetermined before the number is to be dialed again (e.g., redialed at the alternative communication device, etc.).

As provided above, conventional systems have attempted to address the problems of reaching a user to join in a conference meeting by using static blast and/or outbound dial-out option in meetings. These conventional approaches mean that a specific conferencing server must dial out to a user with the user's phone number defined in user details stored on the conferencing server (and not any other number). In addition, these conventional approaches completely depend on the user to be in a same enterprise to know, or even detect, the presence status of the user.

Embodiments of the present disclosure are different and offer a wider opportunity for any voice application (e.g., VoIP application, etc.) user to join any conference meeting within an enterprise or outside of an enterprise (e.g., any third-party conferencing system, etc.) ensuring that the user can join the conference meeting dynamically. Additionally or alternatively, the user may be joined to the conference meeting by the voice application connecting the conference meeting to any communication device where the user is available.

The terms "meeting," "conference," "conference meeting," "scheduled meeting," "scheduled conference meeting," "collaborative communication session," and/or combinations thereof may be used interchangeably herein and may refer to any scheduled event, meeting, or appointment that includes a plurality of invitees and which may require an audio and/or a video communication channel connection.

The terms "presence" and/or "presence status," as used herein, may refer to an availability status of a user associated with an application and/or a client communication device. The presence may indicate the status of the user in real time. In some embodiments, the presence status may be set automatically by the voice application based on activity, or inactivity, with the voice application. In one embodiment, the presence status may be manually set by a user from a number of selectable options. Example presence statuses may include, but are in no way limited to, "away," "available," "busy," "do not disturb," and/or the like.

The terms "voice application," "VoIP client," "VoIP application," and "softphone application," and variations thereof may be used interchangeably herein and may refer to any software application executed by the processor of a communication device that allows users to make, receive, and manage telephone calls, for example, over the Internet. Avaya IX™ Workplace Clients, Avaya Scopia® Desktop Clients, and the like, are examples of voice applications as described herein.

Referring now to FIG. 1, a block diagram of a communication system 100 is shown in accordance with at least some embodiments of the present disclosure. The communication system 100 of FIG. 1 may be a distributed system and, in some embodiments, comprises a communication network 104 connecting one or more communication devices 108 with a conferencing server 112. The communication system 100 may include, but is not limited to, a client communication device 108A, a first alternative communication device 108B, other alternative communication devices 108N, a conferencing server 112, and a personal information manager 116. In some embodiments, the communication devices 108 may be communicatively connected to the conferencing server 112 over a communication channel. The conferencing server 112 may provide collaborative communication sessions, conference meetings, multi-party calls, web-based conferencing, web-based seminars ("webinars"), and/or other audio/video communication services. In any event, the conference meetings can include two, three, four, or more communication devices 108 that access the conferencing server 112 via the communication network 104.

A user 102 is shown in FIG. 1 associated with a particular type of communication device 108 depending on a geographical location of the user 102 at any given time. For instance, the user 102 may be associated with a client communication device 108A when at a first geographical location 110A. The first geographical location 110A may correspond to a business (e.g., work), or enterprise, location where the client communication device 108A is physically located. As described herein the client communication device 108A may comprise a voice application (e.g., a VoIP client, a softphone, etc.) running thereon. The second geographical location 110B may correspond to a home, or nonwork, geographical location. Stated another way, the second geographical location 110B may correspond to a geographical location other than the first geographical location 110A. When the user 102 is away from the first geographical location 110A, the user 102 may be found at the second geographical location 110B. When at the second geographical location 110B, the user 102 may be reached by dialing a number associated with the first alternative communication device 108B. In some embodiments, this first alternative communication device 108B may correspond to a home phone, home computer, or smartphone that is associated with the user 102 and the second geographical location 110B. In some embodiments, the user 102 may be away from the first geographical location 110A and the second geographical location 110B. For example, the user 102 may be traveling from one location to another or be at a different geographical location apart from the client communication device 108A at the first geographical location 110A. These other geographical locations 110N may be associated with one or more other alternative communication devices 108N. In one embodiment, these other alternative communication devices 108N may correspond to phones physically located at the other geographical locations 110N or mobile communication devices (e.g., smartphones, cell phones, etc.) associated with the user 102 when at the other geographical locations 110N.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol ("IP") network consisting of many computers, computing networks, and other communication devices located all over the world, which are connected through many telephone systems and other means. Other examples of the communication network 104 include, without limitation, a standard Plain Old Telephone System ("POTS"), an Integrated Services Digital Network ("ISDN"), the Public Switched Telephone Network ("PSTN"), a Local Area Network ("LAN"), a Wide Area Network ("WAN"), a VoIP network, a Session Initiation Protocol ("SIP") network, a cellular network, and any other type of packet-switched or circuit-switched network known in the art. In addition, it can be appreciated that the communication network 104 need not be limited to any one network type, and instead may be comprised of a number of different networks and/or network types. The communication network 104 may comprise a number of different communication media such as coaxial cable, copper cable/wire, fiber-optic cable, antennas for transmitting/receiving wireless messages, and combinations thereof.

In some embodiments, at least one of the communication devices 108 may correspond to a computing device, a personal communication device, a portable communication device, a laptop, a smartphone, a tablet, a personal computer, and/or any other device capable of running an operating system ("OS"), at least one voice application, a web browser, or the like. The voice application may be configured to exchange communications between a respective communication device 108A-N and the conferencing server 112. For instance, the communication devices 108, when configured as client communication devices (e.g., the client communication device 108A), may be configured to operate various versions of Microsoft Corp.'s Windows® and/or Apple Corp.'s Macintosh® operating systems, any of a variety of commercially-available UNIX® such as LINUX or other UNIX-like operating systems, iOS, Android®, etc. These client communication devices 108, may also have any of a variety of applications, including for example, client applications, web browser applications, chat applications, video applications, social media applications, calling applications, email applications, calendar applications, etc., and/or combinations thereof. In some embodiments, the communication devices 108 may alternatively or additionally be any other electronic device, such as a thin-client computer, Internet-enabled mobile telephone, and/or personal digital assistant, capable of communicating via the communication network 104.

Additionally or alternatively, communications may be sent and/or received via a respective communication device 108 as a telephone call, a packet or collection of packets (e.g., IP packets transmitted over an IP network), an email message, an IM, a short message service ("SMS") message, a multimedia messaging service ("MMS") message, a chat, and/or combinations thereof. As shown in FIG. 1, the communication devices 108 may communicate over an audio and/or a video channel over the communication network 104.

The conferencing server 112 may include hardware and/or software resources that, among other things, provides the ability to hold multi-party calls, conference calls, and/or other collaborative communications. The conferencing server 112 may include a network interface 120, a processor 124, and a memory 128. The conferencing server 112 may comprise a meeting scheduling service, or scheduler 132, audio/video bridge instructions 136, and conferencing information 140, and/or the like.

The network interface 120 provides the conferencing server 112 with the ability to send and receive communication packets or the like over the communication network 104. The network interface 120 may be provided as a network interface card ("NIC"), a network port, a modem, drivers for the same, and the like. Communications between the components of the conferencing server 112 and other devices connected to the communication network 104 for a conference meeting may flow through the network interface 120 of the conferencing server 112. In some embodiments, examples of a suitable network interface 120 include, without limitation, an antenna, a driver circuit, an Ethernet port, a modulator/demodulator, an NIC, an RJ-11 port, an RJ-45 port, an RS-232 port, a USB port, etc. The network interface 120 may include one or multiple different network interfaces depending upon whether the conferencing server 112 is connecting to a single communication network or multiple different types of communication networks. For instance, the conferencing server 112 may be provided with both a wired network interface and a wireless network interface without departing from the scope of the present disclosure. In some embodiments, the network interface 120 may include different communications ports that interconnect with various input/output lines.

In some embodiments, the processor 124 may correspond to one or more computer processing devices. For example, the processor 124 may be provided as silicon, an Application-Specific Integrated Circuit ("ASIC"), as a Field Programmable Gate Array ("FPGA"), any other type of Integrated Circuit ("IC") chip, a collection of IC chips, and/or the like. In some embodiments, the processor 124 may be provided as a Central Processing Unit ("CPU"), a microprocessor, or a plurality of microprocessors that are configured to execute the instructions sets stored in memory 128. Upon executing the instruction sets stored in memory 128, the processor 124 enables various conferencing and/or scheduling functions of the conferencing server 112, and provides conferencing between one or more communication device (e.g., communication devices 108, etc.) over the communication network 104.

The memory 128, or storage memory, may correspond to any type of non-transitory computer-readable medium. In some embodiments, the memory 128 may comprise volatile or non-volatile memory and a controller for the same. Non-limiting examples of the storage memory 128 that may be utilized in the conferencing server 112 may include Random Access Memory ("RAM"), Read Only Memory ("ROM"), buffer memory, flash memory, solid-state memory, or variants thereof. Any of these memory types may be considered non-transitory computer memory devices even though the data stored thereby can be changed one or more times. The memory 128 may be used to store information about conference meetings, past conference meetings, scheduling, invitees to the conference meetings, and/or the like. In some embodiments, the memory 128 may be configured to store rules and/or the instruction sets depicted in addition to temporarily storing data for the processor 124 to execute various types of routines or functions. Although not depicted, the memory 128 may include instructions that enable the processor 124 to store data into a conference data database 118 and retrieve information from the conference data database 118. In some embodiments, the conference data database 118 or data stored therein may be stored internal to the conferencing server 112 (e.g., within the conferencing information 140 of the memory 128 of the conferencing server 112 rather than in a separate database) or in a separate server.

In some embodiments, the meeting scheduling service, or scheduler, 132 may be included in the conferencing server 112 and/or as a separate service or system of components apart from the conferencing server 112 in the communication system 100. In any event, the scheduler 132 provides meeting scheduling resources that can allow a conference meeting organizer, or moderator, to schedule, and invite participants, to a conference meeting. The meeting scheduling service 118 may correspond to a built-in meeting scheduling service such as the meeting and appointment schedulers built into Microsoft Corp.'s Outlook® or Apple Corp.'s Calendar applications, etc. In some embodiments, a meeting organizer may setup a meeting by communicating with the scheduler 132 over the communication network 104 (e.g., via a communication device). The scheduler 132 may comprise audio/video bridge instructions 136 that, when executed by the processor 124, allow the meeting organizer to schedule a day and time for a conference meeting and invite one or more attendees (e.g., the user 102) via email. In some embodiments, the conferencing server 112 may work in concert with the personal information manager 116 of a user 102 and/or an enterprise. For instance, when the meeting organizer sends a conference meeting invitation (e.g., via email to the email address of the user 102), the personal information manager 116 may determine the conference meeting invitation (e.g., received over the email 144 of the user 102, etc.) should be added to a calendar 148 of the user 102 in the personal information manager 116 (e.g., such as Microsoft® Outlook, etc.). In one embodiment, the conference meeting invitation may be stored as an event on the calendar 148 of the user 102 based on the user 102 accepting the invitation.

In some embodiments, the invitation (e.g., sent via email 144 and/or through a calendar 148 application of the user 102, etc.) to inform the invitees of the conference meeting details, obtain responses, and update attendance status, etc. In some embodiments, the scheduler 132 may determine an availability of one or more of the invitees prior to scheduling the conference meeting.

The conferencing server 112 may comprise conferencing resources, such as the audio/video bridge instructions 136 and/or conferencing information 140, that can allow two or more communication devices 108 to participate in a conference meeting. One example of a conference meeting includes, but is not limited to, a web-conference communication session established between two or more users/ parties, webinars, meetings, and the like. Although some embodiments of the present disclosure are discussed in connection with conference meetings, embodiments of the present disclosure are not so limited. Specifically, the embodiments disclosed herein may be applied to one or more of audio, video, multimedia, conference calls, web-conferences, combinations thereof, other collaborative communication sessions, and/or the like.

In some embodiments, the conferencing server 112 can include one or more resources such as conference mixers and other conferencing infrastructure. As can be appreciated, the resources of the conferencing server 112 may depend on the type of conference meeting or communications provided by the conferencing server 112. Among other things, the conferencing server 112 may be configured to provide conferencing of at least one media type between any number of participants (e.g., invitees who have accepted the invitation and joined the conference meeting). The conference mixer of the conferencing server 112 may be assigned to a particular communication session for a predetermined amount of time. In one embodiment, the conference mixer may be configured to negotiate codecs with one or more of the communication devices 108 participating in the conference meeting. Additionally or alternatively, the conference mixer may be configured to receive inputs (at least including audio inputs) from the communication devices 108 and mix the received inputs into a combined signal which can be monitored and/or analyzed by the conferencing server 112.

Figure 2:
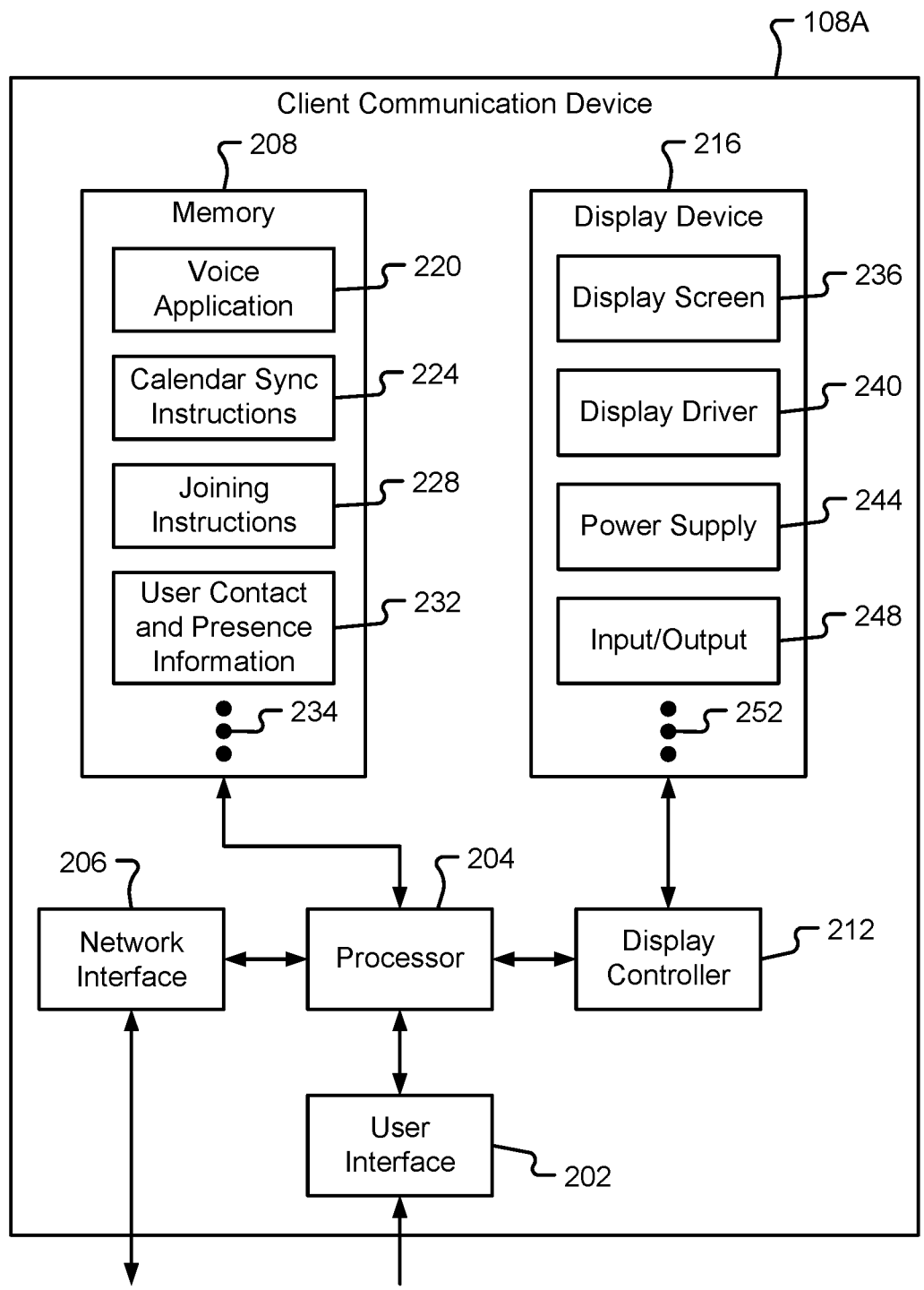
FIG. 2 is a block diagram depicting components of a client communication device used in a communication system in accordance with at least some embodiments of the present disclosure.

FIG. 2 is a block diagram depicting components of a client communication device 108A used in the communication system 100 in accordance with at least some embodiments of the present disclosure. The client communication device 108A is shown to include a computer memory 208 that stores one or more instruction sets, applications, or modules. The client communication device 108A may be configured as a desktop computer, smartphone, and/or the like. The client communication device 108A is also shown to include a user interface 202, one or more processors 204, a network interface 206 (e.g., a network communications interface, etc.), and a display controller 212 that may all be connected to one another via a power and/or a communications bus.

The user interface 202 may correspond to any type of input and/or output device, or combination thereof, that enables a user 102 to interact with the client communication device 108A. As can be appreciated, the nature of the user interface 202 may depend upon the nature of the client communication device 108A. Examples of the user interface 202 may include, but are in no way limited to, user interface hardware and devices such as at least one touch-sensitive display elements, buttons, switches, keyboards, peripheral interface devices (e.g., mice, controller, joysticks, etc.) as described herein. It is an aspect of the present disclosure that one or more devices in the user interface 206 may provide an input that is interpreted by the processor 204 in controlling one or more components of the client communication device 108A.

The processor 204 may correspond to one or many computer processing devices. Non-limiting examples of a processor include a microprocessor, an IC chip, a General Processing Unit ("GPU"), a CPU, or the like. Examples of the processor 204 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, ARM® Cortex™-M processors, ARM® Cortex-A and ARM926EJ-S™ processors, other industry-equivalent processors, and may perform computational functions using any known or future-developed standard, instruction set, libraries, and/or architecture. The processor 204 may be a multipurpose, programmable device that accept digital data as input, processes the digital data according to instructions stored in its internal memory, and provides results as output. The processor 204 may implement sequential digital logic as it has internal memory. As with most microprocessors, the processor 204 may operate on numbers and symbols represented in the binary numeral system.

The network interface 206 may comprise hardware that facilitates communications with other communication devices (e.g., the first alternative communication device 108B, the other alternative communication devices 108N, etc., and/or the conferencing server 112, the personal information manager 116, or server associated therewith, etc.) over the communication network 104. In some embodiments, the network interface 206 may include an Ethernet port, a Wi-Fi card, an NIC, a cellular interface (e.g., antenna, filters, and associated circuitry), or the like. The network interface 206 may be configured to facilitate a connection between the conferencing server 112 and the communication network 104 and may further be configured to encode and decode communications (e.g., packets, etc.) according to a protocol utilized by the communication network 104.

The memory 208 may correspond to any type of non-transitory computer-readable medium. In some embodiments, the memory 208 may comprise volatile or non-volatile memory and a controller for the same. Non-limiting examples of memory 212 that may be utilized in the client communication device 108A may include RAM, ROM, buffer memory, flash memory, solid-state memory, and/or variants thereof. Any of these memory types may be considered non-transitory computer memory devices even though the data stored thereby can be changed one or more times. In some embodiments, the memory 208 may be configured to store rules and/or the instruction sets depicted in addition to temporarily storing data for the processor 124 to execute various types of routines or functions. The computer memory 208 may store the voice application 220, calendar synchronization instructions 224, joining instructions 228, user contact and presence information 232, and/or more 234.

The voice application 220 stored in the computer memory 208 of the client communication device 108A may correspond to a VoIP client, or other softphone application, that enables VoIP calling, access to contact lists, access to voicemail, access to scheduled meetings (e.g., via a digital calendar), chat functionality, unified communications, and/or the like. The voice application 220 may refer to the calendar synchronization instructions 224, the joining instructions 228, and the user contact and presence information 232 in the computer memory 208 in determining an availability of a user 102 at the client communication device 108A and automatically joining the user 102 to a conference meeting via another communication device 108. Data used by the voice application 220 may be stored locally on the client communication device 108A, with a personal information manager 116, with a conference scheduling service or server 112, and/or on a voice service (e.g., one or more VoIP carrier servers, databases, systems, etc.).

The calendar synchronization instructions 224, when executed by the processor 204, may enable the client communication device 108A to synchronize events in a calendar 148 (e.g., calendar application, etc.) with a calendar of the voice application 220. The events in the calendar 148 may include one or more conference meetings that include the user 102 as an invitee. The calendar synchronization instructions 224 may be executed by the processor 204 periodically, continuously, and/or when changes are made to the calendar 148 to ensure synchronization between the events and items in the calendar of the voice application 220 and the calendar 148. In some embodiments, the calendar synchronization instructions 224 may synchronize bidirectionally in that changes made to one calendar (e.g., one the client communication device 108A or the calendar 148 of the personal information manager 116) result in changes made to the other calendar (e.g., the other one of the client communication device 108A or the calendar 148 of the personal information manager 116). In one embodiment, the calendar synchronization instructions 224 may be configured to synchronize only conference meeting invitations (e.g., events) that the user 102 has accepted, or at least not declined.

The joining instructions 228, when executed by the processor 204, may enable the client communication device 108A to determine that a user 102 is not present at, or away from, the client communication device 108A (e.g., at the first geographical location 110A), and in response, dial out to an alternative number (e.g., associated with some alternative communication device 108B-108N of the user 102, etc.) via the network interface 206, and then automatically join the user 102 with a conference meeting through a communication channel established between the alternative communication device 108B-108N and the personal information manager 116, by way of the client communication device 108A. The joining instructions 228 may access contact lists, alternative numbers, presence status of the user 102 at the client communication device 108A, calendar information, conference information, and/or the like in determining whether to join a user 102 with a conference meeting through some alternative communication device 108N.

The user contact and presence information 232 may comprise data about a presence status of the user 102 at the client communication device 108A. In some embodiments, the user contact and presence information 232 may comprise alternative numbers (e.g., associated with at least one alternative communication device 108B-108N, etc.). Examples of the user contact and presence information 232 may include, but is in no way limited to, the data described in conjunction with the data structure 400 of FIG. 4.

In some embodiments, the client communication device 108A may comprise at least one display device 216 that renders information, applications, windows, interactive elements, and/or other visual output to at least one display screen 236. The client communication device 108A may include at least one display controller 212 that controls an operation of the display device 216. This operation may include the control of input (e.g., input provided by the user 102 via the user interface 202, command input via the instruction sets in memory 208, and/or combinations thereof, etc.), output (e.g., display, rendered images, window behavior, etc.) and/or other functions of the display device 216 and a display controller 212.

As described above, the display device 216 may comprise at least one display screen 236 that selectively activates pixels and/or display elements to render one or more applications, windows, controls, interactive elements, icons, characters, images, etc. Examples of the display screen 236 may include, but are in no way limited to, a Liquid Crystal Display ("LCD"), a Light Emitting Diode ("LED") display, an Electroluminescent Display ("ELD"), an Organic LED ("OLED") display, and/or some other type of display. In some embodiments, the display device 216 may be configured to render information in one or more discrete areas (e.g., areas, backgrounds, portions, windows, zones, etc.) of the display screen 236 or superimposed in an area of the display screen 236.

The display device 216 may include a display driver 240, a power supply 244, an input/output 248, and/or other components 252 that enable operation of the display device 216. The display driver 240 may receive commands and/or other data provided by the processor 204 and one or more of the instruction sets in memory 208. In response to receiving the commands, the display driver 240 may generate the driving signals necessary to render the appropriate images to the display screen 236.

The power supply 244 may provide electric power to one or more components of the display device 216. In one embodiment, the power supply 252 may include a transformer and/or other electronics that prevent overloading, condition power signals, and/or provide backup power to the display device 216. The input/output 248 may correspond to one or more connections for receiving or exchanging information and/or video from components of the client communication device 108A (e.g., the processor 204, etc.). The input/output 248 may comprise a high-definition multimedia interface ("HDMI") input, DisplayPort ("DP") input, Ethernet, composite video, component video, H.264, or some other video connection type.

Figure 3:
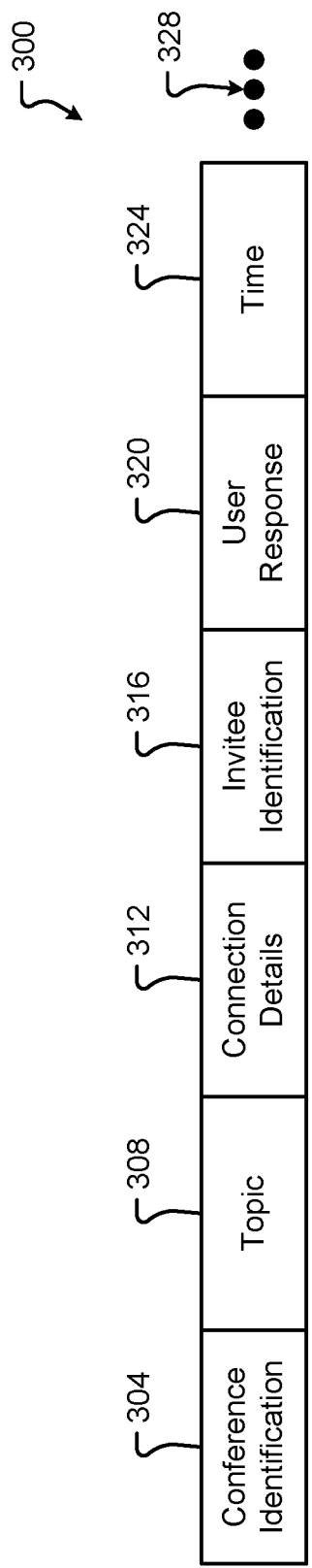
FIG. 3 is a block diagram depicting a conference meeting data structure used in accordance with embodiments of the present disclosure.

Referring to FIG. 3, a block diagram depicting a conference event data structure 300 will be described in accordance with at least some embodiments of the present disclosure. The conference event data structure 300 may include a number of fields that may be used in the various communication flows, methods, and processes outlined herein. For instance, it is anticipated that the conference event data structure 300 shown may be associated with a particular scheduled conference meeting that includes the user 102 as an invitee. The conference event data structure 300 may be used by the client communication device 108A in determining whether a user 102 should be joined with a conferencing server 112 via some alternative communication devices 108B-108N, by way of the client communication device 108A. The conference event data structure 300 may be stored in the computer memory 208 of the client communication device 108A, the conference data database 118, the conferencing information 140 of the conferencing server 112, and/or in the calendar 148 of the personal information manager 116. Examples of such data fields include, without limitation, a conference identification field 304, a topic field 308, a connection details field 312, an invitee identification field 316, a user response field 320, a time field 324, and more 328.

The conference identification field 304 may comprise data used to identify or describe a particular conference meeting from other conference meetings. This identification may be a name, phrase, word, symbol, number, character, and/or combination thereof. The identification may include invitees, timestamps, etc., and/or any other data used to uniquely identify one conference meeting from another in the calendar 148 of the user 102, in the scheduler 132 of the conferencing server 112, etc.

The topic field 308 may comprise data used to identify a subject, topic, or content of the conference meeting identified in the conference identification field 304. The topic may include information that includes a word, phrase, agenda, code word, acronym, and/or the like. In some embodiments, the information in the topic field 308 may identify a reason for holding the conference meeting identified in the conference identification field 304.

The connection details field 312 may comprise data to connect to the conference meeting. This data may include, but is in no way limited to, a phone number, an URL, an access code or passcode, a PIN, or some other permission/authorization data that allows access to the conference meeting. For example, the conferencing server 112 may establish a phone number and an access code that must be used to dial into the conference meeting (e.g., via an audio/video bridge, etc.). In some embodiments, the client communication device 108A may synchronize this information with the voice application 220 (e.g., during the calendar synchronization). When the user 102 is determined by the voice application 220 to be away from the client communication device 108A, the client communication device 108A may dial out to the user 102 via an alternative number associated with an alternative communication device 108B-108N and automatically connect the alternative communication device 108B-108N to the conferencing server 112 for the conference meeting using the data in the connection details field 312.

The invitee identification field 316 may comprise data about one or more invitees to the scheduled conference meeting. This data may include a name, identifier, email address, employee number, alias, symbol, photo, icon, character, or other string of characters to differentiate one invitee from another in the scheduled conference meeting.

The user response field 320 may comprise data corresponding to a response of the one or more invitees identified in the invitee identification field 316. Examples of responses by the invitees may include, but are in no way limited to, "accept," "tentative," "no response," or "declined." In some embodiments, when a user 102 accepts the scheduled conference meeting invitation, the response stored in the user response field 320 associated with that user 102 indicates the user 102 has accepted the invitation and is expected to attend, or participate in, the scheduled conference meeting. In some embodiments, the joining instructions 228 may join a user 102 who is away from the client communication device 108A, only when the user 102 has not declined the invitation. In one embodiment, the joining instructions 228 may join a user 102 who is away from the client communication device 108A, only when the user 102 has affirmatively accepted the invitation. In any event, the indication of the response of the user 102 may be stored in the user response field 320.

The time field 324 may comprise data associated with a time of the scheduled conference meeting. For instance, the time field 324 may include information such as a day, a time of day, and/or a duration of the scheduled conference meeting. This information may be used by the joining instructions 228 in determining whether a scheduled conference meeting that includes the user 102 as a listed attendee is about to begin. In some embodiments, a listed attendee may correspond to a user 102 that is invited (e.g., identified in the invitee identification field 316) and that has accepted, or in some cases not declined, the invitation (e.g., identified by the user response, in the user response field 320).

Figure 4:
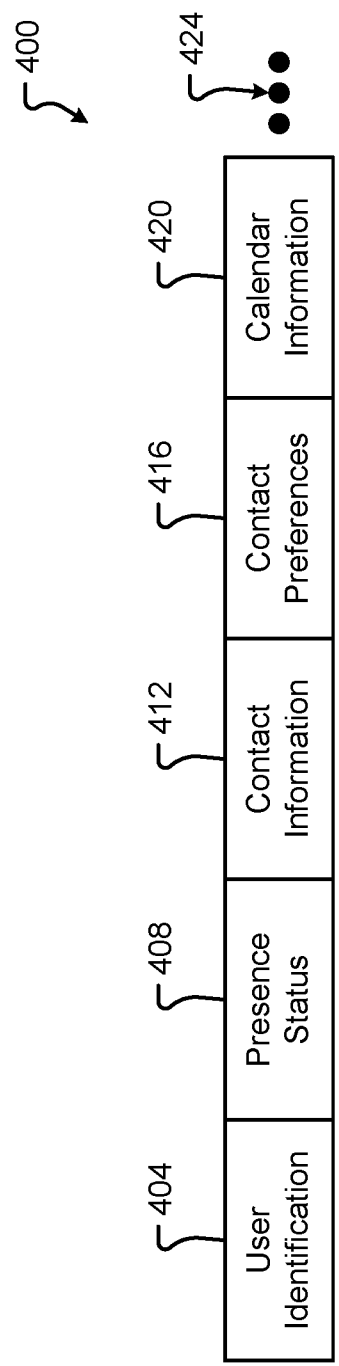
FIG. 4 is a block diagram depicting a user information data structure used in accordance with embodiments of the present disclosure.

FIG. 4 shows a block diagram depicting a user contact and presence information data structure 400 in accordance with at least some embodiments of the present disclosure. The user contact and presence information data structure 400 may include a number of fields that may be used in the various communication flows, methods, and processes outlined herein. For instance, it is anticipated that the user contact and presence information data structure 400 shown may be associated with a user 102 in a communication system 100 (e.g., an enterprise, business, group, etc.). The user contact and presence information data structure 400 may be used by the client communication device 108A in determining whether a user 102 should be joined with a conferencing server 112 via some alternative communication devices 108B-108N, by way of the client communication device 108A. Examples of the data fields in the user contact and presence information data structure 400 may include, without limitation, a user identification field 404, a presence status field 408, a contact information field 412, a contact preferences field 416, a calendar information field 420, and more 424.

The user identification field 404 may be used to store data that identifies the user 102 from other users in the communication system 100. The user identification field 404 may include a username, an email address, an alias, an employee number, or some other unique identification. This identification may be a name, phrase, word, symbol, number, character, and/or combination thereof. In some embodiments, the identification in the initiator identification field 612 may correspond to a MAC address, IP address, hardware identification, etc., and/or combinations thereof associated with the client communication device 108A of the user 102. The information in the user 102 may be used by the client communication device 108A in determining presence status, calendar, and contact information, etc., for a particular identified user 102 in the communication system 100.

The presence status field 408 may comprise data that identifies a current presence status of the user 102 at the client communication device 108A. The presence status defines an "availability" of the user 102 at the client communication device 108A. This availability may be associated with the voice application 220 running on the client communication device 108A. In some embodiments, the presence status may continuously update, periodically update, and/or update when a change in status is detected by the processor 204. The presence status may identify the availability of the user 102 in real time. The presence status may be set automatically by the voice application 220 based on activity, or inactivity, associated with the voice application 220. For instance, after a time period of inactivity at the client communication device 108A and/or the voice application 220, the presence status may be automatically changed to "away" or "unavailable." This presence status may be set when the user 102 is away from the keyboard, or taking a break, etc. In one embodiment, the presence status may be manually set by a user from a number of selectable options. Example presence statuses stored in the presence status field 408 may include, but are in no way limited to, "available," "away," "unavailable," "busy," "do not disturb," and/or the like. In some embodiments, the joining instructions 228 may automatically determine to dial out to the user 102 at an alternative number, as described herein, when the presence status of the user 102 is set to away (e.g., indicating the user 102 is away from the client communication device 108A) and a conference meeting including the user 102 as a listed attendee is about to begin (e.g., based on the time in the time field 324 of the conference event data structure 300, etc.).

The contact information field 412 may comprise alternative numbers associated with one or more of the alternative communication devices 108B-108N associated with the user 102. These alternative communication devices 108B-108N may correspond to any type of alternative communication device 108. In one embodiment, the alternative communication devices 108B-108N may be a hard phone, a standard landline telephone (without software, applications, etc.), a mobile phone, a smartphone, an alternative client communication device (e.g., comprising a voice application, VoIP client, etc.), and/or some other communication device 108. The contact information field 412 may identify a geographical location associated with each of the alternative communication devices 108B-108N. For example, the first alternative communication device 108B may be associated with a second geographical location 110B. This second geographical location 110B may correspond to a home of the user 102. As another example, another alternative communication device 108N may correspond to a mobile geographical location 110N for the user (e.g., an area surrounding the other alternative communication device 108N, etc.). Other examples of geographical locations may include, a car, an alternative business location, a hotel, etc. In some embodiments, the alternative numbers in the contact information field 412 may correspond to phone numbers, links, and/or the like.

The contact preferences field 416 may comprise preferences and/or other information associated with each of the alternative numbers in the contact information field 412. The contact preferences may include an ordered list, or group, of alternative numbers that the client communication device 108A should attempt to use and dial out to reach the user 102 when the user 102 is away from the client communication device 108A. For instance, the user 102 may wish that the client communication device 108A attempt to join the user 102 with a conference meeting through a mobile phone before trying a home phone, or vice versa. In some embodiments, this order may be set or arranged in the contact preferences field 416 of the user contact and presence information data structure 400.

The calendar information field 420 may comprise data that is synchronized between the calendar 148 of a personal information manager 116 and the voice application 220 of the client communication device 108A. The calendar information field 420 may include information for one or more conference meetings listing the user 102 as an attendee. In some embodiments, the calendar information field 420 may include one or more conference event data structures 300 associated with the conference meetings for a user 102. These conference meetings may include single meetings, continuous meetings (e.g., back-to-back meetings, meetings with minimal breaks between start and end times), and/or combinations thereof.

Figure 5:
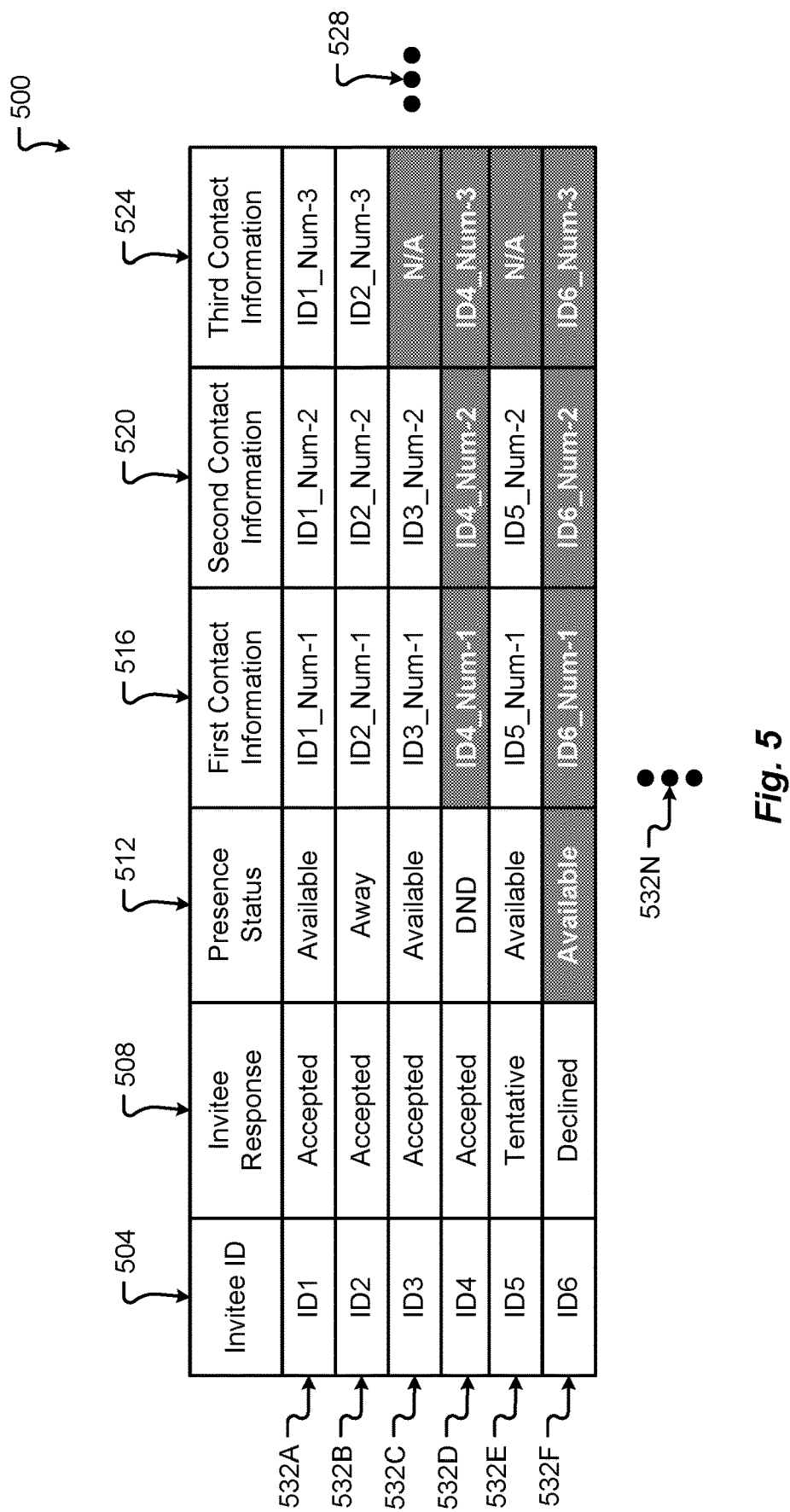
FIG. 5 is a block diagram depicting information associated with invitees of a conference meeting in accordance with embodiments of the present disclosure.

Referring now to FIG. 5, a block diagram depicting information associated with invitees of a conference meeting is shown in accordance with embodiments of the present disclosure. The information may be part of a multiple-party conference meeting data structure 500. The multiple-party conference meeting data structure 500 is shown in the form of a table, but embodiments of the multiple-party conference meeting data structure 500 are not so limited. In some embodiments, the multiple-party conference meeting data structure 500 may be a stored in the calendar 148 of the personal information manager 116, in the conferencing information 140 of the conferencing server 112, and/or in the conference data database 118.

The multiple-party conference meeting data structure 500 is shown as including an invitee identification column 504, an invitee response column 508, a presence status column 512, a first contact information column 516, a second contact information column 520, a third contact information column 524 that may comprise information for each invitee to a scheduled conference meeting. Each invitee to the scheduled conference meeting may be identified in the invitee rows 532A-532N. It should be appreciated that the multiple-party conference meeting data structure 500 may include more or fewer columns and rows than shown in FIG. 5. For example, additional data may be stored for each invitee in additional columns 528. Additionally or alternatively, additional invitees may be identified by the additional invitee rows 532N.

In FIG. 5, first invitee row 532A may be associated with a first invitee in a scheduled conference meeting. As shown in the multiple-party conference meeting data structure 500, the first invitee accepted the invitation to the scheduled conference meeting, is available (e.g., as defined by presence status), and has contact information for three alternative communication devices 108 (e.g., shown in columns 516-524).

The second invitee row 532B may be associated with a second invitee in a scheduled conference meeting. This second invitee may correspond to the user 102 described herein. As shown in the second invitee row 532B, the user 102 has accepted the invitation to the scheduled conference meeting, is currently away (e.g., as defined by presence status) from the client communication device 108A, and also has contact information for three alternative communication devices 108 (e.g., shown in columns 516-524).

The third invitee row 532C may be associated with a third invitee who accepted the invitation to the scheduled conference meeting, is available (e.g., based on presence status), and only has two alternative contact numbers. The fourth invitee row 532D may be associated with a fourth invitee who accepted the invitation to the scheduled conference meeting, but is unavailable and identified as "do not disturb" (e.g., "DND" based on presence status). As the fourth invitee does not wish to be disturbed, the alternative contact numbers will not be considered by the fourth invitee's client communication device in attempting to join the fourth invitee with the scheduled conference meeting (e.g., unless the presence status changes from DND, etc.). The fifth invitee row 532E may be associated with a fifth invitee who tentatively accepted the invitation to the scheduled conference meeting, is available (e.g., based on presence status), and only has two alternative contact numbers. The sixth invitee row 532F may be associated with a sixth invitee who declined the invitation to the scheduled conference meeting and will not be considered for automatically joining (e.g., unless at least the invitee response changes, etc.).

The methods of automatically joining a user 102 with a scheduled conference meeting may be described in conjunction with the second invitee and information illustrated in the multiple-party conference meeting data structure 500.

Figure 6A:
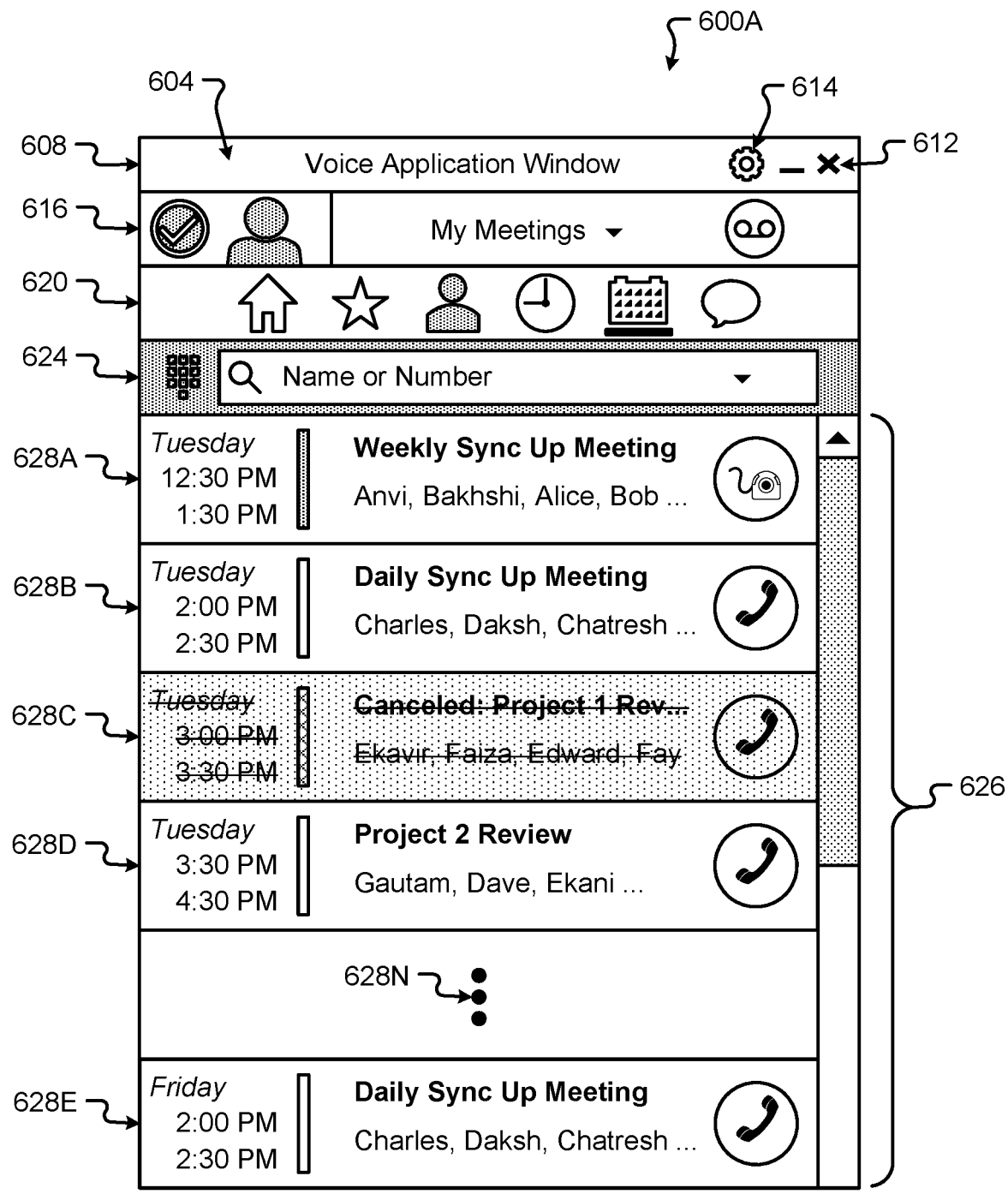
FIG. 6A is a block diagram depicting a first voice application interface presentation in accordance with embodiments of the present disclosure.
Figure 6B:
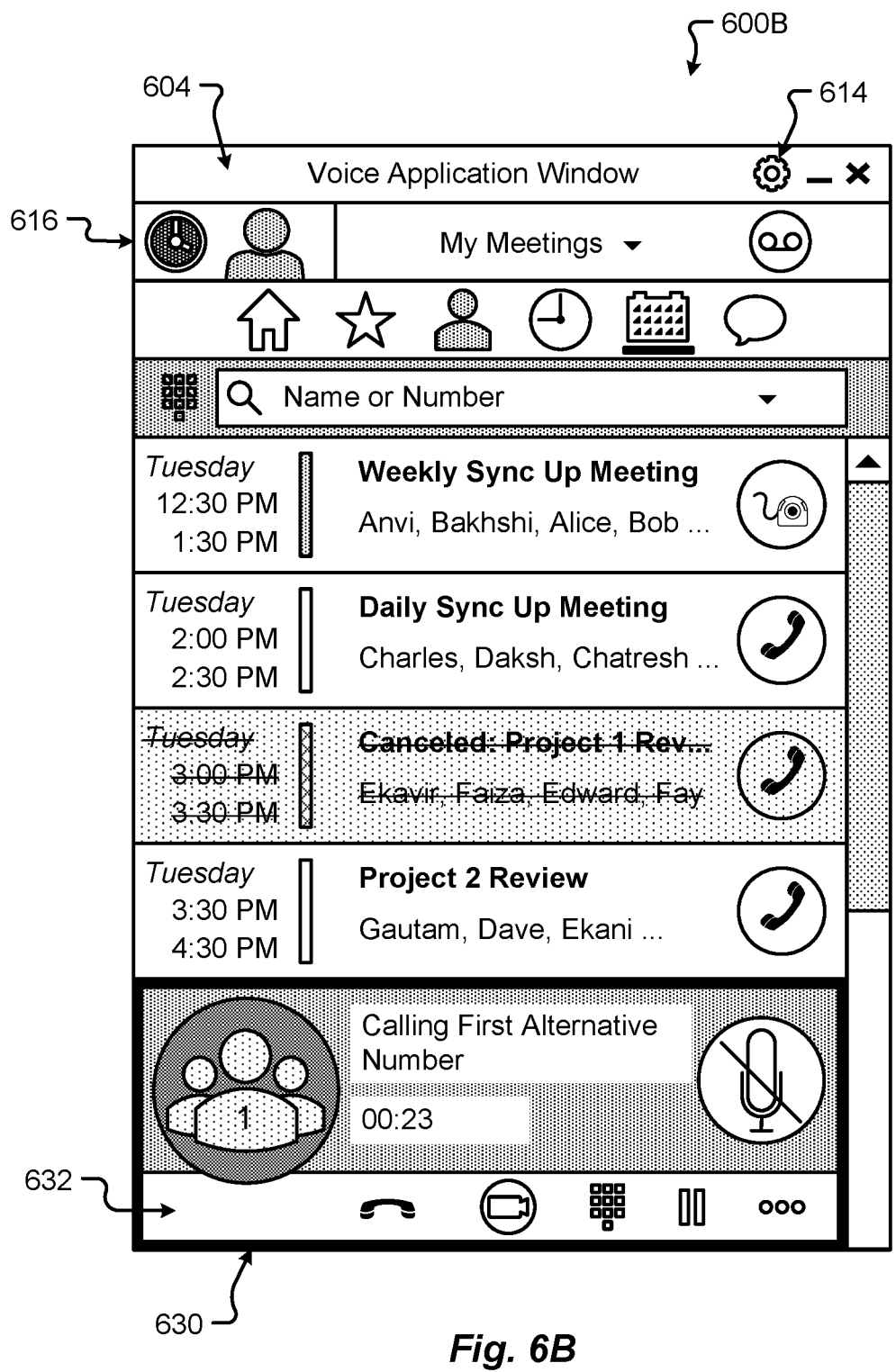
FIG. 6B is a block diagram depicting a second voice application interface presentation in accordance with embodiments of the present disclosure.

FIGS. 6A-6B show block diagrams depicting a user interface of the voice application 220 of the client communication device 108A corresponding to different presence statuses of a user 102. The voice application window 604 can be presented to, or rendered by, a display device 216 of the client communication device 108A. In some embodiments, the voice application window 604 may include a number of viewing areas including, but in no way limited to, a header panel 608 including one or more window controls 612, a user context area 616, a display selection icon area 620, a dial and search area 624, and a conference meeting area 626 including one or more conference meeting slots 628A-628N. Although shown partitioned into a discrete number of viewing areas, embodiments of the voice application window 604 are not limited to the arrangement and layout shown in FIGS. 6A-6B.

The header panel 608 may include an identification of the voice application 220 (e.g., "Voice Application Window," etc.) and the window controls 612. The window controls 612 may include icons that, when selected, minimize the window 604 (e.g., shown by the "_" symbol in the header panel 608), close the voice application window 604 (e.g., shown by the "x" symbol in the header panel 608). Additionally or alternatively, the header panel 608 may include a settings selection control icon 614. The settings selection control icon 614, when selected (e.g., by the user 102), may allow the user 102 to set alternative contact numbers, preferences, etc. These settings may include information corresponding to the information stored in the user contact and presence information data structure 400 described above.

The user context area 616 may display presence status (e.g., indicated by the circular icon on the left-hand side of the user context area 616), an icon or image of the user 102, tab information, and other icons (e.g., a voicemail icon, etc.). The circular icon displaying the presence status may change from one presentation (e.g., shown in the first voice application interface presentation 600A of FIG. 6A) to another presentation (e.g., shown in the second voice application interface presentation 600B of FIG. 6B), or vice versa. As shown in FIG. 6A, the presence status indicated by the circular icon includes a check mark indicating that the user 102 is "available." In FIG. 6B, the presence status indicated by the circular icon includes a clock face indicating that the user 102 is "away."

The display selection icon area 620 may include a number of icons that allow the user 102 to navigate between various application functions of the voice application 220. These icons may include (from left to right) a "home" icon, a "favorites" icon, a "contacts" icon, a "clock/timer" icon, a "calendar" icon, and a "chat" icon, to name a few. As shown in FIGS. 6A-6B, the calendar icon is shown as underlined indicating that calendar events (e.g., scheduled conference meetings of the user 102) are displayed in the conference meeting area 626 of the voice application interface presentations 600A, 600B.

In each voice application interface presentation 600A, 600B, a number of conference meeting slots 628A-628N are shown in the conference meeting area 626. In some embodiments, the conference meeting slots 628A-628N may include a day, a start time, an end time, a conference identification, at least some of the invitees, and a communication channel type identifier, for a respective scheduled conference meeting. In some embodiments, the conference meeting slots 628A-628N may be navigated via scrolling (e.g., via the scroll bar on the right-hand side of the conference meeting area 626), and/or by dragging (e.g., via a touch and/or click interface input) the list of conference meeting slots 628A-628N.

For example, the first conference meeting slot 628 shows that the "Weekly Sync Up Meeting" (e.g., the conference identification, etc.) including "Anvi, Bakhshi, Alice, Bob" as some of the invitees (and that includes the user 102 as an invitee, although not shown), is scheduled to start on "Tuesday" at 12:30 PM and is expected to end at 1:30 PM (e.g., having a one-hour duration). The communication channel type identifier, displayed as a circular icon on the right-hand side of the first conference meeting slot 628A, indicates that the conference meeting will be a video conference (e.g., having a webcam symbol). As another example, the next conference meeting in the second conference meeting slot 628B shows that the "Daily Sync Up Meeting" (e.g., the conference identification, etc.) including "Charles, Daksh, Chatresh" as some of the invitees (and that includes the user 102 as an invitee, although not shown), is scheduled to start on "Tuesday" at 2:00 PM and is expected to end at 2:30 PM (e.g., having a half-hour duration). The communication channel type identifier, displayed as a circular icon on the right-hand side of the second conference meeting slot 628B, indicates that the conference meeting will be an audio conference (e.g., having a phone symbol). The third conference meeting slot 628C shows an example of a meeting that was canceled and has been lined-out and/or greyed-out. The fourth conference meeting slot 628D and the fifth conference meeting slot 628E may include similar details and arrangements as those described above.

In FIG. 6B, the second voice application interface presentation 600B shows that the presence status of the user 102 (e.g., indicated by the circular icon including a clock face symbol) has changed from "available" to "away." In response to determining that the presence status of the user 102 is "away" and that the user 102 is an invitee in a scheduled conference meeting that is about to begin (e.g., the "Weekly Sync Up Meeting," etc.), the client communication device 108A may determine to join the user 102 via an alternative number and communication device 108. The voice application 220 may determine that the meeting is about to begin based on comparing a current time of day with a start time of the scheduled conference meeting. In some embodiments, the comparison may determine that the start time of the scheduled conference meeting is within a predetermined amount of time of the current time of day (e.g., five minutes from starting, two minutes from starting, one minute from starting, etc.). In one embodiment, the comparison may determine that the start time of the scheduled conference meeting matches the current time of day.

As shown in the alternative connection dial-out window 630 of FIG. 6B, the client communication device 108A is calling, or dialing out, to the first alternative number for the user 102 that is associated with an alternative communication device 108B-108N other than the client communication device 108A. The alternative connection dial-out window 630 shows the alternative number the client communication device 108A is dialing out to (e.g., the first alternative number), a time of the calling and/or connection (e.g., the 23 seconds indicated), and may include a number of dial-out control selection icons 632. The dial-out control selection icons 632 may allow a user 102 returning to the client communication device 108A to cancel the dial-out, stop the automatic joining, and/or otherwise control the voice application 220 of the client communication device 108A.

Once the client communication device 108A connects to the alternative communication device 108B-108N via the alternative number, and the user 102 answers, the client communication device 108A may automatically dial into the scheduled conference meeting and connect the alternative communication device 108B-108N with the conferencing server 112 without human input. In some embodiments, this connection may include a communication channel between the alternative communication device 108B-108N, the client communication device 108A, and the conferencing server 112.

Figure 7:
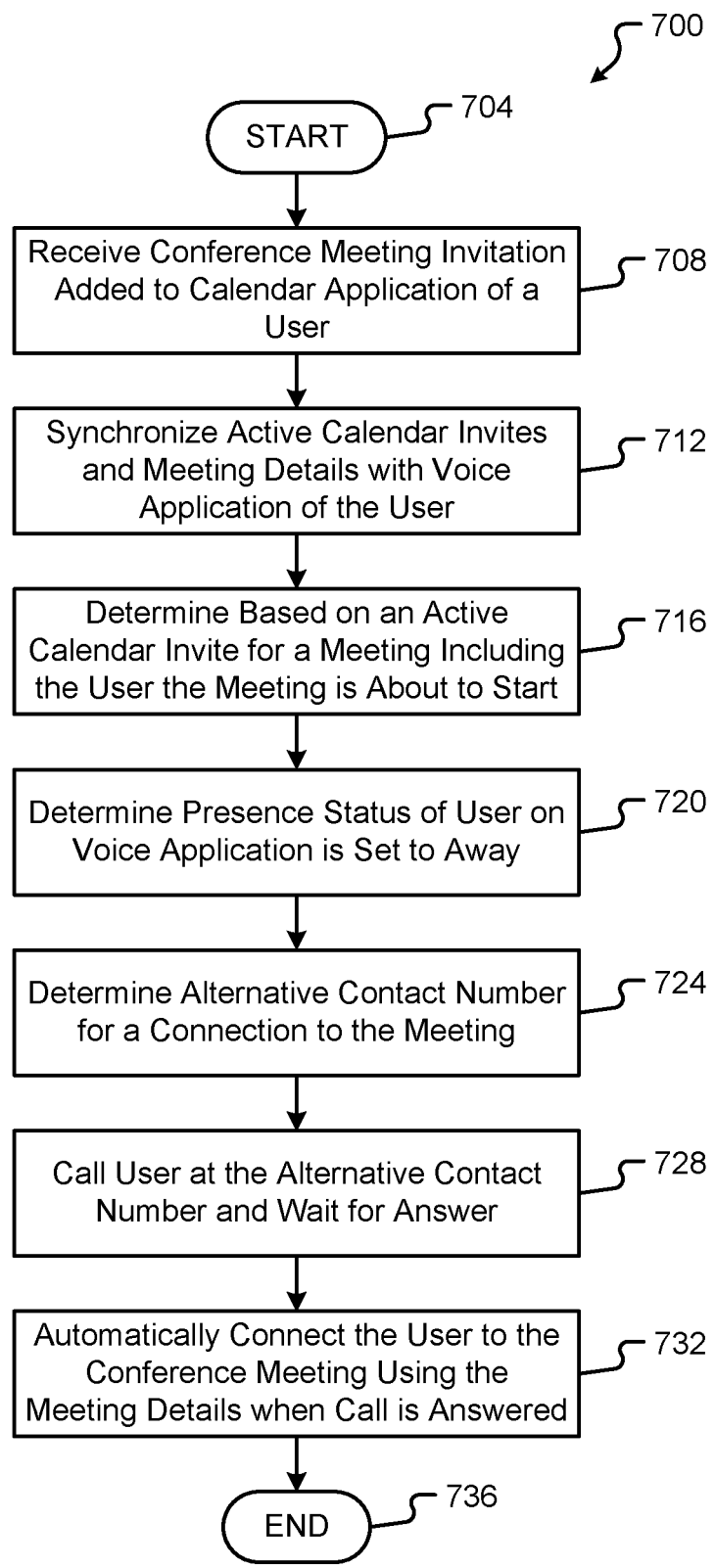
FIG. 7 is a flow diagram depicting a method of automatically joining a user with a conference meeting in accordance with at least some embodiments of the present disclosure.

FIG. 7 is a flow diagram depicting a method 700 of automatically joining a user 102 with a scheduled conference meeting in accordance with at least some embodiments of the present disclosure. The method 700 can be executed as a set of computer-executable instructions (e.g., calendar synchronization instructions 224, joining instructions 228, etc.) executed by a computer system (e.g., the client communication device 108A, etc.) and encoded or stored on a computer readable medium (e.g., the computer memory 208, etc.). Hereinafter, the method 700 shall be explained with reference to the systems, components, modules, applications, software, data structures, user interfaces, etc. described in conjunction with FIGS. 1-6B.

The method 700 begins at step 704 and proceeds by receiving a conference meeting invitation added to a calendar 148 of a user 102 (step 708). In some embodiments, the conference meeting invitation may be sent to the email address of a user 102 from a meeting organizer. The invitation may be an attachment to an email sent to the email server 144 of the user from any email address. In one embodiment, the meeting invitation may be added to the calendar (e.g., the calendar 148, etc.) of the user 102 via a share, or group, access to the calendar of the user 102. In any event, once the user 102 accepts, or does not decline, the conference meeting invitation, the conference meeting, or active calendar invite, may be added as an event to the calendar 148 of the user 102. This calendar 148 may be part of the personal information manager 116 (e.g., Microsoft® Outlook, Apple® Calendar, Google® Calendar, etc.) of the user 102.

Next, the method 700 may proceed by synchronizing active calendar invites and meeting details with the voice application 220 of the user 102 (step 712). The terms "active calendar invite" or "active invite" may be used interchangeably herein to refer to a conference meeting invitation that includes the user 102 as an invitee and that has not been declined by the user 102. In one embodiment a conference meeting invitation that has not been declined may only refer to conference meeting invitations that have been affirmatively accepted (e.g., not tentatively accepted, or ignored, etc.) by the user 102. In some embodiments, the voice application 220 polls and synchronizes the meeting details with a calendar of the user 102 (e.g., a calendar that is part of an email service, calendar service, personal information manager 116, and/or other calendar integrated with the voice application 220 and/or the client communication device 108A, etc.). In some embodiments, synchronizing the active calendar invites and meeting details may be performed by the voice application 220 of the client communication device 108A of the user 102 running the calendar synchronization instructions 224 stored in the computer memory 208. For instance, the calendar synchronization instructions 224, when executed by the processor 204, may enable the client communication device 108A to synchronize events in a calendar 148 (e.g., calendar application, etc.) with a calendar of the voice application 220. In some embodiments, the synchronization may be performed periodically, continuously, and/or when changes are made to the calendar 148 of the user 102 to ensure synchronization between the events and items (e.g., active calendar invites and meeting details, etc.) in the calendar of the voice application 220 and the calendar 148.

As provided above, the meeting details may include at least some of the data stored in the conference event data structure 300 described in conjunction with FIG. 3. For example, the meeting details may include, but is in no way limited to, at least one of the conference identification (e.g., stored in the conference identification field 304), the topic (e.g., stored in the topic field 308), the connection details field 312 (e.g., stored in the connection details field 312), an invitee to the conference meeting (e.g., stored in the invitee identification field 316), a user response (e.g., stored in the user response field 320), and a start time, end time, duration, and/or day of the conference meeting (e.g., stored in the time field 324).

The method 700 may continue by determining, based on a part on the active calendar invites in the calendar of the user 102, that a conference meeting including the user 102 as a listed attendee is about to begin (step 716). In one embodiment, this determination may be made by the voice application 220 determining that a current time of day (e.g., from a computer clock, an atomic time, some other time source, or a time source obtained via the Network Time Protocol ("NTP"), etc.) is within a predetermined amount of time to the start time of the conference meeting. The start time of the conference meeting may be stored in the time field 324 of the conference event data structure 300.

In the event that the method 700 determines a particular conference meeting, including the user 102 as an invitee, is about to being, the method 700 may determine a presence status of the user 102 (step 720). In particular, the method 700 may determine that the presence status is set to "away." This presence status may be stored in the user contact and presence information data structure 400 described in conjunction with FIG. 4 (e.g., in the presence status field 408, etc.). In one embodiment, the presence status may be associated with the voice application 220 of the client communication device 108A.

When the conference meeting is about to begin and that the presence status of the user 102 is set to "away," the method 700 may continue by determining an alternative contact number (associated with a different and alternative communication device 108B-N, other than the client communication device 108A) to reach the user 102 (step 724). In some embodiments, the alternative contact number may be stored in the computer memory 208 of the client communication device 108A of the user 102. For instance, one or more alternative contact numbers for various communication devices 108 of the user 102 may be stored in the user contact and presence information 232. In one embodiment, these alternative contact numbers may be ordered such that the voice application 220 calls, or dials out, to a particular alternative contact number before calling another alternative contact number. By way of example, a user 102 may prefer to have a mobile phone of the user 102 called before a home phone of the user 102. In this example, the alternative contact number of the mobile phone may be ordered before (or ahead of) the alternative contact number of the home phone. The user 102 may change the alternative contact numbers, an order of these alternative contact numbers, etc. via a settings selection control icon 614 of the voice application 220.

The method 700 may proceed by the client communication device 108A calling the user 102 at the alternative contact number determined and by waiting for an answer (step 728). The call may be automatically placed, or made, by the client communication device 108A in response to the determinations made in steps 716-724. If there is no answer via the alternative contact number, for example, after a predetermined amount of time or a predetermined number of rings, the method 700 may return to step 724 and determine yet another alternative contact number (e.g., associated with a different alternative communication device 108B-108N) by which to reach the user 102. In contrast to conventional systems, where a conference server may dial out to invitees at an invitee's phone number, in this case the client communication device 108A of the user 102 (e.g., not the conferencing server 112) calls one or more alternative contact numbers for the user 102. By way of example, a user 102 may have a voice application 220 running on a client communication device 108A (e.g., a workstation, or work computer, etc.) at work. When the user 102 leaves the workstation, and/or is detected as being away from the client communication device 108A (e.g., based on the presence status), and a conference meeting is about to begin, it is the client communication device 108A that calls an alternative contact number of an alternative communication device 108B-108N (e.g., other than the client communication device 108A) for the user 102. At least one benefit to this approach includes allowing the client communication device 108A to automatically and independently call and connect, or join, the alternative communication device 108B-108N of the user 102 to any conference meeting on any conference server, without depending on the conference server, without requiring input from the conference server, and without any dialing out from the conference server. As can be appreciated, the automatic calling and joining, originating, from the client communication device 108A of the user 102 saves time and computing resources of the conferencing server 112, and only occurs when the presence of the user 102 is determined to be set to a particular status (e.g., "away).

Once the call is answered by the user 102 at an alternative communication device 108B-108N, the method 700 may continue by automatically joining the alternative communication device 108B-108N to the conference meeting (step 732). In some embodiments, the user 102 may answer the call from the client communication device 108A at the alternative communication device 108B-108N. The answer may correspond to an off-hook signal at the alternative communication device 108B-108N, an affirmative response at the alternative communication device 108B-108N, and/or an input provided at the alternative communication device 108B-108N. In some embodiments, the voice application 220 may provide a prompt upon connecting to the alternative communication device 108B-108N. The prompt may state "to join your conference meeting, please press or say 1," or provide some other prompt to the user 120. The user 102 may provide a response input (e.g., by pressing, or saying, "1" etc.) and be automatically joined with the conference meeting. In one embodiment, the response input may be based on the alternative communication device 108B-108N connecting and being in an off-hook state. However, in some embodiments, a person other than the user 102 may answer the alternative communication device 108B-108N. In this case, the person may not provide the response input and the method 700 may return to step 724 to determine a different another alternative contact number. In some embodiments, the client communication device 108A may join the alternative communication device 108B-108N to the conference meeting by dialing into the conference meeting on behalf of the user 102 (and without human input) using the meeting details obtained in step 712. For instance, the voice application 220 may use the meeting details from the previously synchronized calendar to join the conference (e.g., at the conferencing server 112) and add the conference into the call between the client communication device 108A and the alternative communication device 108B-108N, all without any required manual intervention by the user. The meeting details may include a meeting number and an access code to enter the conference meeting. All of this information may be provided by the client communication device 108A to the conferencing server 112 automatically and without input from the user 102 at the alternative communication device 108B-108N. In some embodiments, the client communication device 108A may serve as a host for the alternative communication device 108B-108N to connect with the conferencing server 112. In one embodiment, the communication channel may include the client communication device 108A, the alternative communication device 108B-108N, and the conferencing server 112. The method 700 may end at 736.

Figure 8:
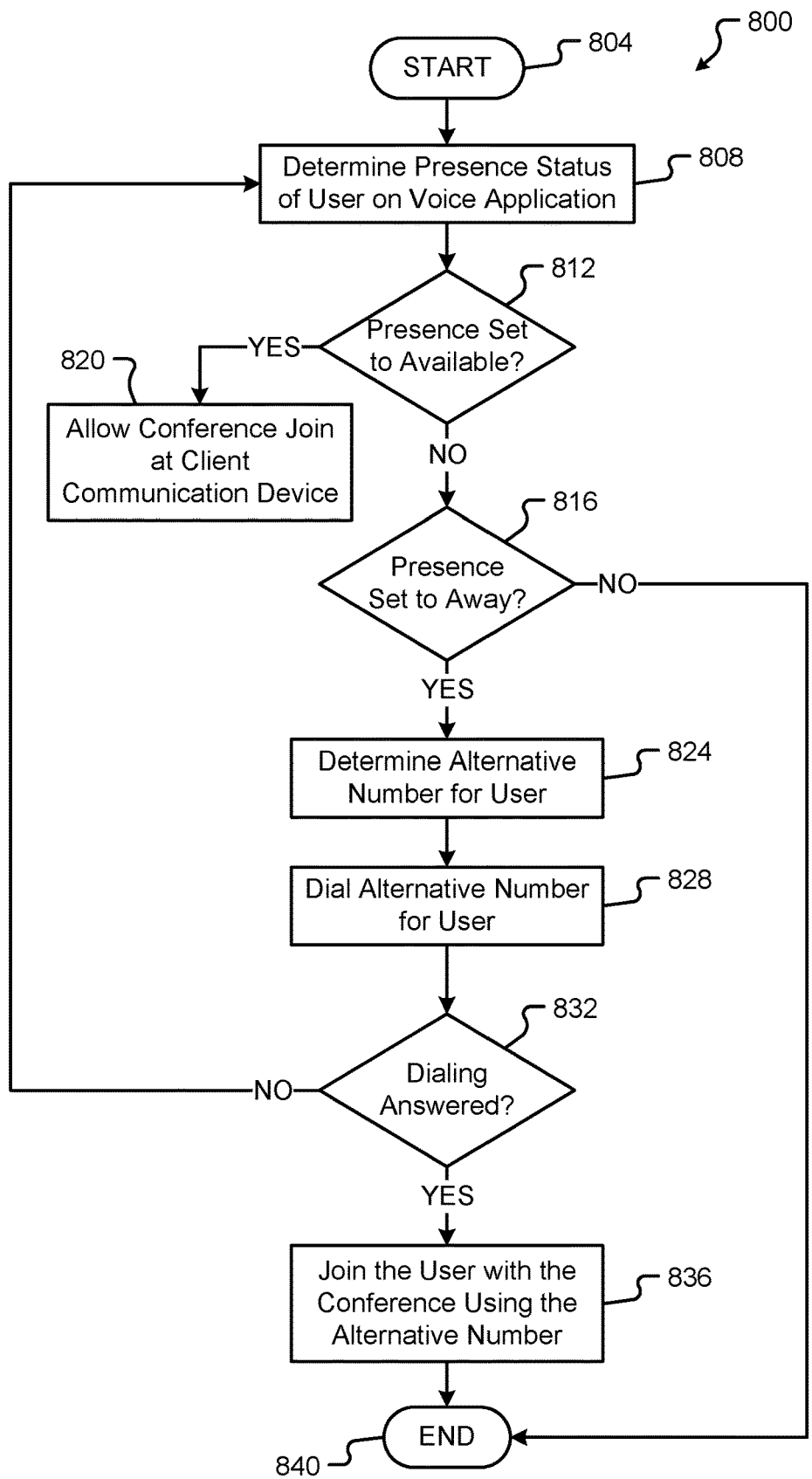
FIG. 8 is a flow diagram depicting a method of automatically determining and dialing an alternative contact number when joining a user with a conference meeting in accordance with embodiments of the present disclosure.

FIG. 8 is a flow diagram depicting a method 800 of automatically determining and dialing an alternative contact number when joining a user 102 with a scheduled conference meeting in accordance with embodiments of the present disclosure. The method 800 can be executed as a set of computer-executable instructions (e.g., calendar synchronization instructions 224, joining instructions 228, etc.) executed by a computer system (e.g., the client communication device 108A, etc.) and encoded or stored on a computer readable medium (e.g., the computer memory 208, etc.). Hereinafter, the method 800 shall be explained with reference to the systems, components, modules, applications, software, data structures, user interfaces, etc. described in conjunction with FIGS. 1-7.

In some embodiments, the method 800 depicted in FIG. 8 may correspond to steps 720-732 of the method 700 described in conjunction with FIG. 7. In one embodiment, the method 800 may proceed after determining that a conference meeting including the user as a listed attendee is about to begin. The method 800 begins at step 804 and proceeds by determining the presence status of the user 102 on the voice application 220 of the client communication device 108A (step 808). The presence status may indicate whether a user 102 is within proximity to and/or available at the client communication device 108A. At times, the user 102 may be located apart from the client communication device 108A. This state of being located apart from the client communication device 108A may referred to herein as "away." A user 102 is "away" from the client communication device 108A when the user 102 goes on a break (away from the client communication device 108A), returns home (e.g., when the client communication device 108A is located at work), works remotely, is traveling, and/or like. In some embodiments, the presence status may be set by the user 102 prior to leaving the client communication device 108A. In one embodiment, the presence status may be set by the voice application 220, automatically, upon determining inactivity at the client communication device 108A (or a lack of interaction with the voice application 220) for a predetermined amount of time. For example, when the user 102 does not interact with the client communication device 108A and/or the voice application 220 for at least 15-30 minutes, the voice application 220 may determine to set the presence status (e.g., stored in the user contact and presence information 232, etc.) to "away." When the user 102 is in physical proximity to the client communication device 108A and/or is engaging with the client communication device 108A the presence status may be set to "available."

The method 800 proceeds by determining an appropriate next action based on the presence status set for the user 102 of the client communication device 108A. For instance, when the voice application 220 determines that the presence status of the user 102 is set to "available" (step 812), the method 800 may proceed by simply allowing the conference call to join at the client communication device 108A. Stated another way, the client communication device 108A would not need to call, or dial out, to any alternative contact number or device 108. However, the presence status may not be "available" and the voice application 220 may need to determine whether the presence status is set to "away" or some other status (step 816). If the presence status is neither set to "away" nor "available" the method 800 may determine (e.g., by process of elimination) that the presence status is set to "do not disturb" or "busy" and end at step 840 (because the user 102 wishes to not be disturbed or cannot be interrupted). In these cases, the method 800 may end at step 840.

When the client communication device 108A determines that the presence status is set to "away," the method 800 may proceed to determine an alternative contact number for the user 102 (step 824). As provided above, the user 102 and/or an administrator may add one or more alternative contact numbers for the user 102 in a storage memory. In one embodiment, the storage memory may correspond to the computer memory 208 of the client communication device 108A. Each of the alternative contact numbers may be associated with a respective alternative communication device 108B-108N. The alternative communication devices 108B-108N do not include the client communication device 108A. The alternative contact numbers may correspond to phone numbers (e.g., telephone numbers, mobile phone numbers, VoIP numbers, etc.).

The alternative contact numbers may be arranged in an order in which the client communication device 108A must call. For example, the user 102 may prefer to be first called at home before on a mobile device. In this example, the alternative contact number for the home of the user 102 would be arranged first, or before, the alternative contact number for the mobile device. This ordered arrangement may be similar, if not identical, to the arrangement of the alternative contact numbers shown in the contact information columns 516-524 described in conjunction with FIG. 5. As illustrated in FIG. 5, the alternative contact number stored in the first contact information column 516 (e.g., having the suffix "_Num-1") for each invitee may correspond to the first ordered alternative contact number or preferred alternative contact number. The alternative contact number stored in the second contact information column 520 (e.g., having the suffix "_Num-2") for each invitee may correspond to the second ordered alternative contact number or the number that should be called after the first ordered alternative contact number. The alternative contact number stored in the third contact information column 524 (e.g., having the suffix "_Num-3") for each invitee, if available, may correspond to the third ordered alternative contact number or the number that should be called after the first ordered alternative contact number and the second ordered alternative contact number.

Once determined, the method 800 may proceed by the client communication device 108A calling the alternative contact number for the user 102 (step 828). The calling may include the client communication device 108A executing an autodialing routine of the voice application 220. The calling may comprise an interactive voice response ("IVR") executed by the processor 204 of the client communication device 108A. In some embodiments, the client communication device 108A may call the determined alternative contact number by sending a signal, via the network interface 206, comprising each number in a string defined by the determined alternative contact number.

Next, the method 800 may continue by determining whether the call, or dialing-out, by the client communication device 108A was answered (step 832). In one embodiment, when the alternative communication device 108B-108N associated with the determined alternative contact number picks up, or goes off-hook, the call may be determined to have been answered. For instance, the signal provided to the client communication device 108A, when the called device 108B-108N goes off-hook may serve as an input that the call has been answered. In some embodiments, answering the call may require an affirmative acceptance of the call after the alternative communication device 108B-108N associated with the determined alternative contact number goes off-hook. In this example, the user 102 may be required to provide an input at the alternative communication device 108B-108N that indicates the user 102 is actually at the alternative communication device 108B-108N (e.g., via a voice response, a touch input, a button input, etc., and/or some other input). This input may be provided by the user 102 in response to a prompt provided by the client communication device 108A. The prompt may correspond to an option, a request, or an interaction provided by the IVR of the client communication device 108A.

In some embodiments, the calling may not be answered within a predetermined amount of time or within a predetermined number of rings. Additionally or alternatively, the calling may not be answered in response to a person declining to accept the call at the alternative communication device 108B-108N. In this example, the person may provide a negative response input by declining to accept the call at the alternative communication device 108B-108N. In any event, when the calling is not answered, the method 800 may return to step 808 and/or return to step 824 to determine if the client communication device 108A should call a different alternative contact number.

When the calling is answered, the method 800 may proceed by automatically joining the alternative communication device 108B-108N and user 102 with the conference meeting (step 836). Automatically joining the alternative communication device 108B-108N with the conference meeting may comprise the client communication device 108A dialing into the conference meeting, at the conferencing server 112, using the meeting details associated with the synchronized calendar of the voice application 220. For example, the client communication device 108A, while connected via a communication channel with the alternative communication device 108B-108N over the communication network 104, may establish a communication connection with the conferencing server 112. In establishing the communication connection with the conferencing server 112, the client communication device 108A may provide, or enter, at least one of a conference telephone number and an access code to enter the conference meeting without human input and without requiring the user 102 to enter any of the meeting details from the alternative communication device 108B-108N. As provided above, this number and/or code may be retrieved from the meeting details associated with the conference meeting and stored in the calendar event for the conference meeting in the calendar of the voice application 220 and the calendar 148 of the personal information manager 116. When the communication connection with the conferencing server 112 is established, the client communication device 108A may merge the call with the alternative communication device 108B-108N into the communication connection with the conferencing server 112 providing a communication channel between the client communication device 108A, the alternative communication device 108B-108N, and the conferencing server 112. In one embodiment, the communication channel may be hosted by the client communication device 108A. When the conference meeting is over, the communication channel may be terminated by the client communication device 108A. The method 800 ends at step 840.

Any of the steps, functions, and operations discussed herein can be performed continuously and automatically.

The exemplary systems and methods of this disclosure have been described in relation to client communication devices, scheduled conference meetings, and communication systems. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein. For instance, while described in conjunction with client-server networks (e.g., conferencing servers, client devices, etc.), it should be appreciated that the components, systems, and/or methods described herein may be employed as part of a peer-to-peer network or other network. As can be appreciated, in a peer-to-peer network, the various components or systems described in conjunction with the communication system 100 may be part of one or more endpoints, or computers, participating in the peer-to-peer network.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, sub-combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments of the present disclosure include a client communication device, comprising: a network communications interface; a processor coupled to the network communications interface; and a memory coupled to and readable by the processor and storing therein instructions that, when executed by the processor, cause the processor to: retrieve a presence status associated with a voice application running on the client communication device; determine, based on the presence status, that a user of the client communication device is away from the client communication device; determine that a conference meeting including the user as a listed attendee is about to begin; determine, in response to determining that the conference meeting is about to begin, an alternative contact number associated with a first alternative communication device of the user; call, automatically across a communication network via the network communications interface, the first alternative communication device using the alternative contact number; and join, automatically, the first alternative communication device with the conference meeting when the call is answered by the user at the first alternative communication device.

Aspects of the above client communication device include wherein the first alternative communications device is running an instance of the voice application. Aspects of the above client communication device include wherein the voice application is a Voice over Internet Protocol (VoIP) client application. Aspects of the above client communication device include wherein prior to determining that the conference meeting including the user as a listed attendee is about to begin the instructions, when executed by the processor, further cause the processor to: synchronize active calendar invites and meeting details between a calendar scheduling service linked to the client communication device and a calendar of the voice application running on the client communication device, wherein the active calendar invites comprise scheduled conference meetings that the user has accepted, and wherein the meeting details comprise at least one of a conference meeting phone number, Uniform Resource Locator (URL), and an access code. Aspects of the above client communication device include wherein the instructions, when executed by the processor, further cause the processor to: determine, automatically, a subsequent alternative contact number associated with a second alternative communication device of the user when the call is unanswered by the user at the first alternative communication device within a predetermined time period; call, automatically across the communication network via the network communications interface, the second alternative communication device using the subsequent alternative contact number; and join, automatically, the second alternative communication device with the conference meeting when the call is answered by the user at the second alternative communication device. Aspects of the above client communication device include wherein joining the first alternative communication device with the conference meeting further comprises instructions that, when executed by the processor, cause the processor to: connect, without human input and using the meeting details synchronized and that are associated with the conference meeting including the user as the listed attendee, the first alternative communication device with the conference meeting via a communication channel provided by the client communication device. Aspects of the above client communication device include wherein the call is answered by the user at the first alternative communication device when the first alternative communication device is determined to be off-hook. Aspects of the above client communication device include wherein the call is answered by the user at the first alternative communication device when the client communication device connects to the first alternative communication device via an active communication channel and when a join acceptance response is received by the client communication device based on an input from the first alternative communication device. Aspects of the above client communication device include wherein the input is provided at the first alternative communication device in response to a prompt provided by the client communication device. Aspects of the above client communication device include wherein the instructions, when executed by the processor, further cause the processor to: cause the prompt to be rendered to a display of the first alternative communication device, and wherein the input is a touch-based input provided by the user at the first alternative communication device.

Embodiments of the present disclosure include a method, comprising: retrieving, via a processor of a client communication device of a user, a presence status associated with a voice application running on the client communication device; determining, via the processor and based on the presence status, that the user is away from the client communication device; determining, via the processor, that a conference meeting including the user as a listed attendee is about to begin; determining, via the processor in response to determining that the conference meeting is about to begin, an alternative contact number associated with a first alternative communication device of the user; calling, via the processor, the first alternative communication device using the alternative contact number; and joining, automatically via the processor, the first alternative communication device with the conference meeting when the calling is answered by the user at the first alternative communication device.

Aspects of the above method include wherein the voice application is a Voice over Internet Protocol (VoIP) client application. Aspects of the above method include wherein prior to determining that the conference meeting including the user as a listed attendee is about to begin the method further comprises: synchronizing, via the processor, active calendar invites and meeting details between a calendar scheduling service linked to the client communication device and a calendar of the voice application running on the client communication device, wherein the active calendar invites comprise scheduled conference meetings that the user has accepted, and wherein the meeting details comprise at least one of a conference meeting phone number, Uniform Resource Locator (URL), and an access code. Aspects of the above method further comprise: determining, automatically via the processor, a subsequent alternative contact number associated with a second alternative communication device of the user when the calling is unanswered by the user at the first alternative communication device with a predetermined time period; calling, automatically via the processor, the second alternative communication device using the subsequent alternative contact number; and joining, automatically via the processor, the second alternative communication device with the conference meeting when the calling is answered by the user at the second alternative communication device. Aspects of the above method include Aspects of the above method include Aspects of the above method include wherein joining the first alternative communication device with the conference meeting further comprises: connecting, via the processor without human input and using the meeting details synchronized and that are associated with the conference meeting including the user as the listed attendee, the first alternative communication device with the conference meeting via a communication channel hosted by the client communication device. Aspects of the above method include wherein the calling is answered by the user at the first alternative communication device when the first alternative communication device is determined, by the processor, to be off-hook. Aspects of the above method include wherein the calling is answered by the user at the first alternative communication device when the client communication device connects to the first alternative communication device via an active communication channel and when a join acceptance response is received by the client communication device based on an input from the first alternative communication device. Aspects of the above method include wherein the input is provided at the first alternative communication device in response to a prompt provided by the client communication device.

Embodiments of the present disclosure include a communication device, comprising: a network communications interface; a processor coupled to the network communications interface; and a memory coupled to and readable by the processor and storing therein instructions that, when executed by the processor, cause the processor to: synchronize active calendar information between a calendar service of a user associated with the communication device and a calendar of a voice application running on the communication device; determine, based on the synchronized calendar information, that a scheduled conference meeting including the user as a listed attendee is about to begin; determine a presence of the user is set to away indicating that the user is inactive at the voice application running on the communication device; determine, in response to determining that the scheduled conference meeting is about to begin and that the presence of the user is set to away, an alternative contact number associated with a first alternative communication device of the user; call, automatically across a wireless communication network, the first alternative communication device using the alternative contact number; and join, automatically, the first alternative communication device with the conference meeting when the call is answered by the user at the first alternative communication device.

Aspects of the above communication device include wherein the instructions, when executed by the processor, further cause the processor to: determine, automatically, a subsequent alternative contact number associated with a second alternative communication device of the user when the call is unanswered by the user at the first alternative communication device within a predetermined time period; call, automatically across the communication network via the network communications interface, the second alternative communication device using the subsequent alternative contact number; and join, automatically, the second alternative communication device with the conference meeting when the call is answered by the user at the second alternative communication device.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, ARM® Cortex™-M processors, ARM® Cortex-A and ARIVI926EJ-S™ processors, other industry-equivalent processors, and may perform computational functions using any known or future-developed standard, instruction set, libraries, and/or architecture.

Methods described or claimed herein can be performed with traditional executable instruction sets that are finite and operate on a fixed set of inputs to provide one or more defined outputs. Alternatively or additionally, methods described or claimed herein can be performed using AI, machine learning, neural networks, or the like. In other words, a system or server is contemplated to include finite instruction sets and/or artificial intelligence-based models/neural networks to perform some or all of the steps described herein.

What is claimed is:

1. A client communication device, comprising:
a network communications interface;
a processor coupled to the network communications interface; and
a memory coupled to and readable by the processor and storing therein instructions that, when executed by the processor, cause the processor to:
retrieve a presence status associated with a voice application running on the client communication device;
determine, based on the presence status, that a user of the client communication device is away from the client communication device;
determine that a conference meeting including the user as a listed attendee is about to begin, wherein the conference meeting is provided by a conferencing server;
determine, in response to determining that the conference meeting is about to begin, an alternative contact number associated with a first alternative communication device of the user, wherein the first alternative communication device is located in a different geographic location than a location of the client communication device;
call, automatically across a communication network via the network communications interface, the first alternative communication device using the alternative contact number; and
join, automatically, the first alternative communication device with the conference meeting provided by the conferencing server when the call is answered by the user at the first alternative communication device.

2. The client communication device of claim 1, wherein the first alternative communication device is running an instance of the voice application.

3. The client communication device of claim 1, wherein the voice application is a Voice over Internet Protocol (VoIP) client application.

4. The client communication device of claim 1, wherein prior to determining that the conference meeting including the user as the listed attendee is about to begin the instructions, when executed by the processor, further cause the processor to:
synchronize active calendar invites and meeting details between a calendar scheduling service linked to the client communication device and a calendar of the voice application running on the client communication device, wherein the active calendar invites comprise scheduled conference meetings that the user has accepted, and wherein the meeting details comprise at least one of a conference meeting phone number, a Uniform Resource Locator (URL), and an access code.

5. The client communication device of claim 4, wherein the instructions, when executed by the processor, further cause the processor to:
determine, automatically, a subsequent alternative contact number associated with a second alternative communication device of the user when the call is unanswered by the user at the first alternative communication device within a predetermined time period;
call, automatically across the communication network via the network communications interface, the second alternative communication device using the subsequent alternative contact number; and
join, automatically, the second alternative communication device with the conference meeting provided by the conferencing server when the call is answered by the user at the second alternative communication device.

6. The client communication device of claim 4, wherein joining the first alternative communication device with the conference meeting further comprises instructions that, when executed by the processor, cause the processor to:
connect, without human input and using the meeting details synchronized and that are associated with the conference meeting including the user as the listed attendee, the first alternative communication device with the conference meeting via a communication channel provided by the client communication device, and wherein the first alternative communication device is in communication with the conferencing server over the communication channel provided by the client communication device.

7. The client communication device of claim 4, wherein the call is answered by the user at the first alternative communication device when the first alternative communication device is determined to be off-hook.

8. The client communication device of claim 4, wherein the call is answered by the user at the first alternative communication device when the client communication device connects to the first alternative communication device via an active communication channel and when a join acceptance response is received by the client communication device based on an input from the first alternative communication device.

9. The client communication device of claim 8, wherein the input is provided at the first alternative communication device in response to a prompt provided by the client communication device.

10. The client communication device of claim 8, wherein the instructions, when executed by the processor, further cause the processor to:
cause the prompt to be rendered to a display of the first alternative communication device, and wherein the input is a touch-based input provided by the user at the first alternative communication device.

11. A method, comprising:
retrieving, via a processor of a client communication device of a user, a presence status associated with a voice application running on the client communication device;
determining, via the processor and based on the presence status, that the user is away from the client communication device;
determining, via the processor, that a conference meeting including the user as a listed attendee is about to begin, wherein the conference meeting is provided by a conferencing server;
determining, via the processor in response to determining that the conference meeting is about to begin, an alternative contact number associated with a first alternative communication device of the user, wherein the first alternative communication device is located in a different geographic location than a location of the client communication device;
calling, via the processor, the first alternative communication device using the alternative contact number; and
joining, automatically via the processor, the first alternative communication device with the conference meeting provided by the conferencing server when the calling is answered by the user at the first alternative communication device.

12. The method of claim 11, wherein the voice application is a Voice over Internet Protocol (VoIP) client application.

13. The method of claim 11, wherein prior to determining that the conference meeting including the user as the listed attendee is about to begin the method further comprises:
synchronizing, via the processor, active calendar invites and meeting details between a calendar scheduling service linked to the client communication device and a calendar of the voice application running on the client communication device, wherein the active calendar invites comprise scheduled conference meetings that the user has accepted, and wherein the meeting details comprise at least one of a conference meeting phone number, a Uniform Resource Locator (URL), and an access code.

14. The method of claim 13, further comprising:
determining, automatically via the processor, a subsequent alternative contact number associated with a second alternative communication device of the user when the calling is unanswered by the user at the first alternative communication device with a predetermined time period;
calling, automatically via the processor, the second alternative communication device using the subsequent alternative contact number; and
joining, automatically via the processor, the second alternative communication device with the conference meeting provided by the conference server when the calling is answered by the user at the second alternative communication device.

15. The method of claim 13, wherein joining the first alternative communication device with the conference meeting further comprises:
connecting, via the processor without human input and using the meeting details synchronized and that are associated with the conference meeting including the user as the listed attendee, the first alternative communication device with the conference meeting via a communication channel hosted by the client communication device, and wherein the first alternative communication device is in communication with the conferencing server over the communication channel hosted by the client communication device.

16. The method of claim 13, wherein the calling is answered by the user at the first alternative communication device when the first alternative communication device is determined, by the processor, to be off-hook.

17. The method of claim 13, wherein the calling is answered by the user at the first alternative communication device when the client communication device connects to the first alternative communication device via an active communication channel and when a join acceptance response is received by the client communication device based on an input from the first alternative communication device.

18. The method of claim 17, wherein the input is provided at the first alternative communication device in response to a prompt provided by the client communication device.

19. A communication device, comprising:
a network communications interface;
a processor coupled to the network communications interface; and
a memory coupled to and readable by the processor and storing therein instructions that, when executed by the processor, cause the processor to:
synchronize active calendar information between a calendar service of a user associated with the communication device and a calendar of a voice application running on the communication device;
determine, based on the synchronized calendar information, that a scheduled conference meeting including the user as a listed attendee is about to begin, wherein the conference meeting is provided by a conferencing server;
determine a presence of the user is set to away indicating that the user is inactive at the voice application running on the communication device;

determine, in response to determining that the scheduled conference meeting is about to begin and that the presence of the user is set to away, an alternative contact number associated with a first alternative communication device of the user, wherein the first alternative communication device is located in a different geographic location than a location of the communication device;

call, automatically across a wireless communication network, the first alternative communication device using the alternative contact number; and join, automatically, the first alternative communication device with the conference meeting provided by the conferencing server when the call is answered by the user at the first alternative communication device.

20. The communication device of claim 19, wherein the instructions, when executed by the processor, further cause the processor to:

determine, automatically, a subsequent alternative contact number associated with a second alternative communication device of the user when the call is unanswered by the user at the first alternative communication device within a predetermined time period;

call, automatically across the communication network via the network communications interface, the second alternative communication device using the subsequent alternative contact number; and join, automatically, the second alternative communication device with the conference meeting provided by the conferencing server when the call is answered by the user at the second alternative communication device.

\* \* \* \* \*